United States Patent
Dal Pra' et al.

(10) Patent No.: US 10,202,164 B2
(45) Date of Patent: Feb. 12, 2019

(54) ACTUATION DEVICE FOR A CONTROL CABLE FOR A BICYCLE GEARSHIFT

(75) Inventors: Giuseppe Dal Pra', Zane (IT); Marco Caiazzo, Torri di Quartesolo (IT); Andrea De Pretto, Piovene Rocchette (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 12/234,050

(22) Filed: Sep. 19, 2008

(65) Prior Publication Data

US 2009/0025504 A1 Jan. 29, 2009

Related U.S. Application Data

(63) Continuation of application No. 11/051,908, filed on Feb. 4, 2005, now Pat. No. 7,461,573.

(30) Foreign Application Priority Data

Feb. 6, 2004 (EP) ..................................... 04425075

(51) Int. Cl.
*B62K 23/06* (2006.01)
*B62M 25/04* (2006.01)
*F16C 1/12* (2006.01)

(52) U.S. Cl.
CPC .............. *B62K 23/06* (2013.01); *B62M 25/04* (2013.01); *F16C 1/12* (2013.01); *Y10T 74/2042* (2015.01);
(Continued)

(58) Field of Classification Search
CPC .......... F16C 1/10; B62M 25/00; B62M 25/04; B62K 23/04; B62K 23/02; B62K 23/06;
(Continued)

(56) References Cited

U.S. PATENT DOCUMENTS

| 1,706,542 A | 3/1929 | Pugh et al. |
| 2,313,602 A * | 3/1943 | Van Cleave .................... 74/505 |

(Continued)

FOREIGN PATENT DOCUMENTS

| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — David M Fenstermacher
(74) *Attorney, Agent, or Firm* — Volpe and Koenig, P.C.

(57) ABSTRACT

The described actuation device comprises a casing, intended for the attachment to the handlebar of the bicycle, a cable-winding bobbin, angularly mobile in the casing about a main axis of the device, a first driving mechanism, acting on the bobbin to rotate it in a first angular direction, a second driving mechanism, acting on the bobbin to rotate it in a second angular direction opposite the first, as well as indexer assembly for removably holding the bobbin in predetermined angular positions. In accordance with the invention, the indexer assembly comprise first countering member, to counter the rotation of the bobbin in the first direction, and second countering member, distinct from the first countering member, to counter the rotation of the bobbin in the second direction. Asymmetric operation is thus obtained which allows active actuation to be set both for upward gearshifting and for downward gearshifting.

31 Claims, 18 Drawing Sheets

(52) U.S. Cl.
CPC .... *Y10T 74/20402* (2015.01); *Y10T 74/20438* (2015.01)

(58) Field of Classification Search
CPC .. B62L 3/02; B62L 23/04; B62L 23/02; B62L 23/06; Y10T 74/20636; Y10T 74/20438; Y10T 74/2042; Y10T 74/20402; Y10T 74/20396
USPC ... 74/502.2, 488, 489, 473.14, 501.6, 500.5, 74/504–507
See application file for complete search history.

(56) References Cited

U.S. PATENT DOCUMENTS

| | | | |
|---|---|---|---|
| 2,384,728 A | 9/1945 | Crumble | |
| 2,586,604 A | 2/1952 | Bennett | |
| 2,770,980 A | 11/1956 | Millward | |
| 2,854,857 A | 10/1958 | Gleasman et al. | |
| 3,279,779 A * | 10/1966 | Kloss et al. | 267/153 |
| 3,760,648 A | 9/1973 | Hoffman | |
| 3,776,061 A | 12/1973 | Yoshigai | |
| 3,915,029 A * | 10/1975 | Shimada | 74/502.2 |
| 3,972,247 A | 8/1976 | Armstrong | |
| 4,002,350 A | 1/1977 | Timbs | |
| 4,075,871 A | 2/1978 | Burke | |
| 4,100,820 A | 7/1978 | Evett | |
| 4,319,673 A | 3/1982 | Kojima | |
| 4,343,201 A * | 8/1982 | Shimano | 74/473.14 |
| 4,454,784 A * | 6/1984 | Shimano | 74/473.1 |
| 4,459,871 A | 7/1984 | Shimano | |
| 4,605,240 A | 8/1986 | Ciem et al. | |
| 4,676,118 A * | 6/1987 | Leiter | 74/527 |
| 4,736,651 A * | 4/1988 | Nagano | 74/523 |
| 4,740,001 A | 4/1988 | Torleumke | |
| 4,751,850 A * | 6/1988 | Nagano | 74/488 |
| 4,768,395 A * | 9/1988 | Tagawa | 74/489 |
| D298,309 S | 11/1988 | Coue | |
| 4,815,330 A * | 3/1989 | Nagano | 74/473.13 |
| 4,840,082 A | 6/1989 | Terashima et al. | |
| 4,885,951 A | 12/1989 | Desenclos et al. | |
| 4,930,368 A * | 6/1990 | Nagano | 74/502.2 |
| 4,945,785 A | 8/1990 | Romano | |
| 4,966,046 A | 10/1990 | Tagawa | |
| 5,012,692 A | 5/1991 | Nagano | |
| 5,020,387 A | 6/1991 | Nagano | |
| 5,050,444 A | 9/1991 | Nishimura | |
| 5,094,120 A | 3/1992 | Tagawa | |
| RE34,007 E | 7/1992 | Desenclos et al. | |
| 5,159,851 A | 11/1992 | Rahmes | |
| 5,186,071 A | 2/1993 | Iwasaki | |
| 5,203,213 A | 4/1993 | Nagano | |
| 5,213,005 A | 5/1993 | Nagano | |
| 5,222,412 A | 6/1993 | Nagano | |
| 5,241,878 A | 9/1993 | Nagano | |
| 5,257,683 A | 11/1993 | Romano | |
| 5,279,179 A | 1/1994 | Yoshigai | |
| 5,287,765 A | 2/1994 | Scura | |
| 5,303,608 A | 4/1994 | Iwasaki | |
| 5,400,675 A | 3/1995 | Nagano | |
| 5,476,776 A | 12/1995 | Wilkins | |
| 5,479,776 A | 1/1996 | Romano | |
| 5,480,356 A | 1/1996 | Campagnolo | |
| 5,515,743 A | 5/1996 | Lumpkin | |
| 5,528,954 A | 6/1996 | Yoshigai | |
| 5,601,001 A | 2/1997 | Kawakami et al. | |
| 5,676,020 A | 10/1997 | Jordan et al. | |
| 5,676,021 A | 10/1997 | Campagnolo | |
| 5,676,022 A | 10/1997 | Ose | |
| 5,755,139 A | 5/1998 | Kojima | |
| 5,787,757 A | 8/1998 | Ozaki | |
| 5,791,195 A | 8/1998 | Campagnolo | |
| 5,806,372 A | 9/1998 | Campagnolo | |
| 5,832,782 A | 11/1998 | Kawakami | |
| 5,896,779 A | 4/1999 | Biersteker et al. | |
| 5,900,705 A | 5/1999 | Kimura | |
| 5,921,140 A | 7/1999 | Lemmens et al. | |
| 5,970,816 A | 10/1999 | Savard | |
| 6,073,730 A | 6/2000 | Abe | |
| 6,095,010 A | 8/2000 | Arbeiter | |
| 6,098,488 A | 8/2000 | Vos | |
| 6,370,981 B2 | 4/2002 | Watarai | |
| 6,457,377 B1 | 10/2002 | Hsu | |
| 6,502,477 B1 | 1/2003 | Assel | |
| 6,553,861 B2 | 4/2003 | Ose | |
| 6,564,670 B2 | 5/2003 | Feng et al. | |
| 6,564,671 B2 | 5/2003 | Ose | |
| 6,647,823 B2 | 11/2003 | Tsumiyama et al. | |
| 6,792,826 B2 | 9/2004 | Dal Pra' | |
| 7,100,471 B2 | 9/2006 | Irie et al. | |
| 2002/0078789 A1 | 6/2002 | Chen | |
| 2002/0104401 A1 | 8/2002 | Dal Pra' | |
| 2002/0124679 A1 | 9/2002 | Dal Pra' | |
| 2002/0139637 A1 | 10/2002 | Tsumiyama et al. | |
| 2003/0094064 A1 | 5/2003 | Dal Pra' | |
| 2003/0167871 A1 | 9/2003 | Irie et al. | |
| 2003/0177855 A1 | 9/2003 | Tsumiyama et al. | |
| 2004/0144193 A1 | 7/2004 | Sato et al. | |
| 2004/0237697 A1 | 12/2004 | Kawakami | |
| 2004/0237698 A1 | 12/2004 | Hilsky et al. | |
| 2005/0241428 A1 | 11/2005 | Tsai | |
| 2006/0070480 A1 | 4/2006 | Fujii | |
| 2006/0207375 A1 | 9/2006 | Jordan et al. | |
| 2006/0272443 A1 | 12/2006 | Tsumiyama | |
| 2007/0034037 A1 | 2/2007 | Dal Pra' et al. | |
| 2007/0068332 A1 | 3/2007 | Fujii et al. | |
| 2007/0137388 A1 | 6/2007 | Dal Pra' | |
| 2007/0137391 A1 | 6/2007 | Fujii | |
| 2007/0178715 A1 | 8/2007 | Fujii | |
| 2007/0186715 A1 | 8/2007 | Dal Pra' | |
| 2007/0193386 A1 | 8/2007 | Fujii | |
| 2007/0204716 A1 | 9/2007 | Dal Pra' | |
| 2008/0098848 A1 | 5/2008 | Dal Pra' et al. | |
| 2008/0196537 A1 | 8/2008 | Dal Pra' | |
| 2008/0210041 A1 | 9/2008 | Dal Pra' et al. | |
| 2008/0210042 A1 | 9/2008 | Dal Pra' | |
| 2009/0025504 A1 | 1/2009 | Dal Pra' et al. | |
| 2009/0031846 A1 | 2/2009 | Dal Pra' et al. | |
| 2009/0133526 A1 | 5/2009 | Dal Pra' et al. | |

FOREIGN PATENT DOCUMENTS

| | | |
|---|---|---|
| CN | 2436412 | 6/2001 |
| CN | 1443679 | 9/2003 |
| CN | 1550405 | 12/2004 |
| DE | 3136922 | 3/1983 |
| DE | 3706545 | 9/1988 |
| DE | 19607640 | 1/1997 |
| DE | 202006006796 | 8/2006 |
| EP | 0371254 | 6/1990 |
| EP | 0371254 A1 | 6/1990 |
| EP | 0478901 | 4/1992 |
| EP | 0504118 | 9/1992 |
| EP | 0504118 A1 | 9/1992 |
| EP | 0361335 | 2/1994 |
| EP | 0601211 A1 | 6/1994 |
| EP | 0601221 | 6/1994 |
| EP | 0635422 | 1/1995 |
| EP | 0714826 | 6/1996 |
| EP | 0714826 A2 | 6/1996 |
| EP | 0744334 | 11/1996 |
| EP | 0790175 | 8/1997 |
| EP | 1123861 | 8/2001 |
| EP | 1134158 A2 | 9/2001 |
| EP | 1245483 | 10/2002 |
| EP | 0785128 | 11/2002 |
| EP | 1264765 | 12/2002 |
| EP | 1342655 | 9/2003 |
| EP | 1342655 A2 | 9/2003 |
| EP | 1440878 | 7/2004 |
| EP | 1449756 | 8/2004 |
| EP | 1449756 A1 | 8/2004 |
| EP | 1473220 | 11/2004 |
| EP | 1481883 | 12/2004 |

(56) References Cited

FOREIGN PATENT DOCUMENTS

| | | | |
|---|---|---|---|
| EP | 1502847 | | 2/2005 |
| EP | 1535829 | | 6/2005 |
| EP | 1535829 | A2 | 6/2005 |
| EP | 1564131 | | 8/2005 |
| EP | 1642823 | | 4/2006 |
| EP | 1698550 | | 9/2006 |
| EP | 1739001 | | 1/2007 |
| EP | 1816066 | | 8/2007 |
| EP | 1826111 | | 8/2007 |
| FR | 960276 | | 4/1950 |
| FR | 2777528 | | 10/1999 |
| FR | 2861686 | | 2/2006 |
| GB | 615173 | | 1/1949 |
| GB | 2012893 | | 8/1979 |
| GB | 2012893 | A | 8/1979 |
| JP | 58003987 | | 6/1956 |
| JP | 51060342 | | 5/1976 |
| JP | 17893 | | 1/1982 |
| JP | 17894 | | 1/1982 |
| JP | 58030884 | A | 2/1983 |
| JP | 224879 | | 12/1983 |
| JP | 60107475 | | 6/1985 |
| JP | 157092 | | 10/1989 |
| JP | 2088384 | | 3/1990 |
| JP | H02225191 | A | 9/1990 |
| JP | 03292280 | | 12/1991 |
| JP | 04331689 | | 11/1992 |
| JP | H04331689 | A | 11/1992 |
| JP | 05097088 | A | 4/1993 |
| JP | 05286476 | | 11/1993 |
| JP | H05082786 | U | 11/1993 |
| JP | H06016170 | A | 1/1994 |
| JP | 07033063 | A | 2/1995 |
| JP | 07251784 | | 10/1995 |
| JP | 08328679 | A | 12/1996 |
| JP | 2002347687 | A | 12/2002 |
| JP | 2003261084 | A | 9/2003 |
| JP | 2004-249978 | A | 9/2004 |
| JP | 2005153864 | A | 6/2005 |
| JP | 61241287 | | 10/2007 |
| TW | 136125 | Y | 6/1990 |
| TW | 510875 | | 11/2002 |
| TW | 519089 | | 1/2003 |
| TW | 570013 | Y | 1/2004 |
| TW | I223636 | B | 11/2004 |
| WO | 1992018374 | | 10/1992 |
| WO | 2003093094 | | 11/2003 |
| WO | 2005044656 | | 5/2005 |

OTHER PUBLICATIONS

Chinese Office Action, Appl. No. CN 200710005823.3, dated Sep. 25, 2009.
Chinese Office Action, Appl. No. CN 200810082341.2, dated Nov. 30, 2010.
European Search Report, Appl. No. EP 05425458.6, dated Nov. 16, 2005.
European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007.
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Oct. 16, 2008.
Japanese Office Action, Appl. No. JP 2008-550914, dated May 24, 2011.
Japanese Office Action, Appl. No. JP 2002-332045, dated Dec. 16, 2008.

* cited by examiner

ACTUATION DEVICE FOR A CONTROL CABLE FOR A BICYCLE GEARSHIFT

CROSS REFERENCE TO RELATED APPLICATIONS

This application is a continuation of U.S. patent application Ser. No. 11/051,908, filed Feb. 4, 2005, which is incorporated by reference as if fully set forth.

FIELD OF THE INVENTION

The present invention concerns an actuation device for a control cable for a bicycle gearshift. The following description is made with reference to devices specially designed for bicycles with straight handlebars (typical of mountain bikes), but the invention clearly does not depend upon the shape of the handlebars and upon the consequent design of the actuation device; therefore, the invention can also be used in devices for racing cycles, with curved handlebars.

BACKGROUND

A bicycle is normally provided with two gearshifts, a front one associated with the crankset and a rear one associated with the sprocket set. In both cases, the gearshift comprises a derailleur which engages the drive chain moving it on toothed wheels with different diameters and numbers of teeth, so as to obtain different transmission ratios; the derailleur, be it that of the rear gearshift or that of the front gearshift, is moved in a direction by a traction action applied by an inextensible cable that is normally sheathed (commonly known as Bowden cable), in the opposite direction by the elastic return action of a spring provided in the gearshift itself. Normally, the direction in which the displacement is determined by the return spring is that in which the chain passes from a toothed wheel of greater diameter to a toothed wheel of smaller diameter, i.e. that of so-called downward gearshifting; vice-versa, the traction action of the control cable takes place in the direction of so-called upward gearshifting, in which the chain moves from a toothed wheel of smaller diameter to a toothed wheel of greater diameter. It should be noted that in a front gearshift downward gearshifting corresponds to the passage to a lower transmission ratio, whereas in a rear gearshift it corresponds to a greater transmission ratio.

The displacement in the two directions of the control cable of a gearshift is obtained through an actuation device mounted so as to be easy to operate by the cyclist, i.e. normally on the handlebars, near to its grips. By convention, near to the left grip there is the actuation device of the control cable of the front gearshift and vice-versa near to the right grip there is the actuation device of the control cable of the rear gearshift.

In the actuation device, the control cable is actuated into traction or into release through winding and unwinding on a rotor element, commonly known as cable-winding bobbin, the rotation of which is controlled by the cyclist with different means according to the type of gearshift. In a typical configuration, the actuation device provides two distinct ratchet gear levers, to control the rotation in the two directions of the bobbin.

In any case, the actuation device must provide that the bobbin be held still in rotation in a number of predetermined angular positions, corresponding to the different positions of the derailleur required by the different ratios, i.e. on the different toothed wheels of the gearshift. Thus, the actuation device of a front gearshift has a relatively low number of predetermined angular positions (typically three), corresponding to the positions of the front derailleur on the different crowns of the crankset; a rear gearshift, on the other hand, has a relatively high number of predetermined angular positions (typically from seven to ten), corresponding to the positions of the rear derailleur on the different sprockets.

The holding in the predetermined positions is obtained by so-called indexer assembly, which must ensure that the cable-winding bobbin is held sufficiently strongly to keep the set position with precision even in the presence of knocks and bangs during ride, but at the same time also sufficiently yielding to allow the passage from one position to the other when the cyclist actuates the levers to change ratio.

Fundamentally, two types of actuation devices are known, those known as release and active devices.

In release actuation devices, the rotation of the cable-winding bobbin in the winding direction of the cable takes place thanks to the physical force applied by the cyclist on the appropriate lever, whereas the rotation in the opposite direction is obtained substantially by freeing the cable-winding bobbin and letting the return spring on the gearshift act in the direction to unwind the cable from the bobbin, clearly in a controlled manner. In these devices, therefore, during upward gearshifting, the cyclist must first overcome the holding action of the indexer assembly, then the return action of the spring of the derailleur, until the gearshifting is completed; during downward gearshifting, on the other hand, the cyclist must only overcome initially the holding action of the indexer assembly, whereas the return action of the spring of the derailleur is of help during the entire gearshifting. The return action of the spring of the derailleur, however, comes from an elastic-type force, and is therefore different according to the position; in particular, it is greater towards the high gear positions and smaller towards the low gear positions (by high and low gears meaning not long or short ratios, but rather ratios at which one arrives with upward gearshifts or with downward gearshifts). This determines an operative asymmetry that may be unwelcome for the cyclist, especially in demanding conditions of use like during a race.

To remedy the drawbacks of release devices, active devices have been developed, in which the cyclist is required to apply an active force during the entire gearshifting, be it downwards or upwards. In such a device, an elastic member is provided that counters the return action of the spring of the derailleur. The action of such elastic means is balanced with that of the spring of the derailleur, so that—if as a hypothesis the indexer assembly were missing and the only actions on the bobbin were those of the elastic means and of the return spring—the cable-winding bobbin would be arranged in an intermediate position, thus corresponding to an intermediate ratio of the gearshift.

However, such a device does not totally solve the problem. Indeed, with it gearshifting (upward or downward) moving away from the intermediate ratio are countered, whereas gearshifting (upward or downward) moving towards the intermediate ratio are facilitated.

There is therefore the problem of making the force required of the cyclist more homogeneous for different gearshifting.

SUMMARY

The present invention relates to an actuation device for a control cable for a bicycle gearshift, comprising a casing, intended for the attachment to the handlebar of a bicycle, a cable-winding bobbin, angularly mobile in the casing about a main axis of the device, a first driving mechanism, acting on the bobbin to rotate it in a first angular direction, a second driving mechanism, acting on the bobbin to rotate it in a second angular direction opposite the first, indexer assembly to removably hold the bobbin in predetermined angular positions, wherein said indexer assembly comprise first countering member, to counter the rotation of the bobbin in the first direction, second countering member, distinct from the first countering member, to counter the rotation of the bobbin in the second direction.

BRIEF DESCRIPTION OF THE DRAWINGS

Further characteristics and advantages of the invention shall become clearer from the following description of its preferred embodiments, given with reference to the attached drawings. In such drawings FIGS. 1 to 9 concern an actuation device of the control cable of a front gearshift (left control), and FIGS. 10 to 20 concern an actuation device of the control cable of a rear gearshift (right control), both structurally integrated with a control device of the brake; more specifically.

DETAILED DESCRIPTION OF THE PREFERRED EMBODIMENTS

Introduction to the Embodiments

Figure 1:
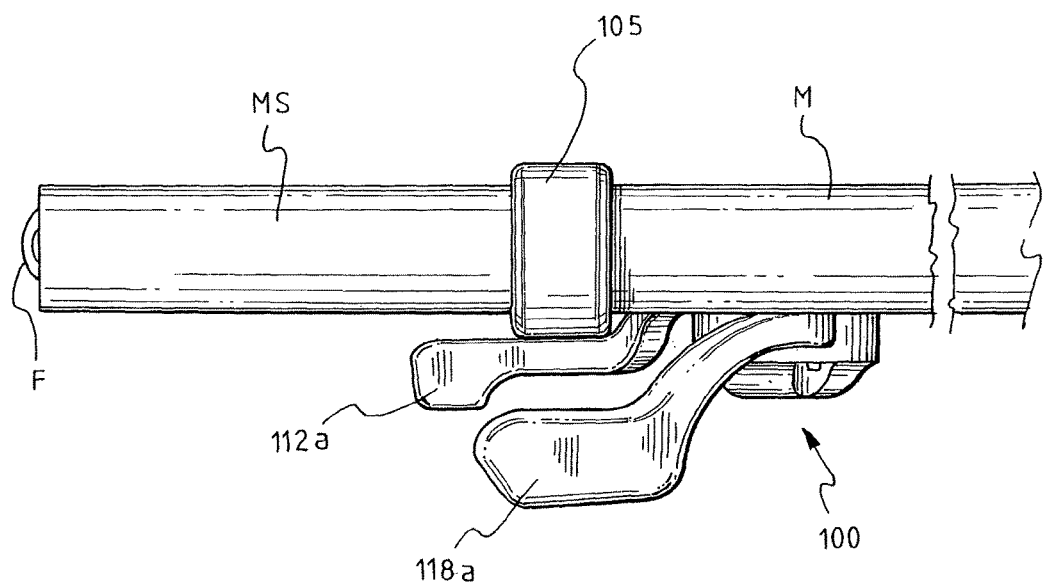
FIG. 1 is a view of an actuation device of the control cable of a front gearshift (left device), mounted on a straight handlebar, from the observation point of the cyclist.

In particular, the present invention concerns an actuation device for a control cable for a bicycle gearshift, comprising:
- a casing, intended for attachment to the handlebars of the bicycle,
- a cable-winding bobbin, angularly mobile in the casing about a main axis (B) of the device,
- a first driving mechanism, active on the bobbin to rotate it in a first angular direction,
- a second driving mechanism, active on the bobbin to rotate it in a second angular direction opposite the first,
- indexer assembly for removably holding the bobbin in predetermined angular positions, characterized in that said indexer assembly comprise:
- first countering member, to counter the rotation of the bobbin in the first direction,
- second countering member, distinct from the first countering member, to counter the rotation of the bobbin in the second direction.

Providing indexer assembly equipped with countering members that are different according to the direction of rotation of the bobbin allows the holding action of the indexer assembly to be calibrated independently with regard to the two directions of rotation of the cable-winding bobbin, and thus allows the return action of the spring of the derailleur of the gearshift to be balanced better.

Preferably, the first countering member counters the rotation of the bobbin in a different way to the second countering member. Thus, the clearly asymmetric influence of the return spring of the derailleur on the actuation device is easier to balance, with a corresponding asymmetric action in the opposite direction of the indexer assembly.

Preferably, the first or the second countering member—and even more preferably both—counter the rotation of the bobbin independently of the angular position of the bobbin itself. By this it is meant that the countering members counter the rotation of the bobbin with the same force for different gearshifting, both between low gear positions and between high gear positions; for example, therefore, to pass from the first to the second position one must overcome the same countering force that must be overcome to pass from the third position to the fourth position.

Preferably:
- the indexer assembly comprise at least one ball engaged both with a stationary member integral with the casing and with a rotating member integral in rotation with the bobbin;
- the first countering member comprises a first countering spring that acts upon the ball to keep it in a stop position in which the stationary member and the rotating member are made integral in rotation;
- the second countering member comprises a second countering spring that acts upon the ball to keep it in the stop position.

The use of an elastically biased ball—per se known in the art—makes the action of the indexer assembly particularly reliable and certain; the use of two distinct springs to bias the spring against the rotation of the bobbin in the two directions allows the differentiation of the countering member that forms the basis of the invention to be achieved in a simple manner.

Preferably, therefore, a rotation of the bobbin in the first angular direction biases the ball away from the stop position, in contrast to the first countering spring.

Preferably, in an analogous manner, a rotation of the bobbin in the second angular direction biases the ball away from the stop position, in contrast to the second countering spring.

Preferably:
- the indexer assembly comprise a ball-carrying disc, mounted in the casing and provided with at least one radial groove, said ball being mounted in said radial groove so that the ball is thrusted radially outwards from the first countering spring, the groove being open on at least one side of the ball-carrying disc and having a depth such that the ball projects in the axial direction from the ball-carrying disc;
- the indexer assembly comprise a first indexing disc, mounted in the casing in a position facing and adjacent to the ball-carrying disc, towards the side thereof from which the ball projects, and provided with a recess arranged according to a path that comprises stop zones and sliding zones alternating with each other;
- one from the ball-carrying disc and the first indexing disc is located in the stationary member, being mounted integral in rotation with the bobbin, whereas the other of them is located in the rotating member, being mounted locked in rotation with the casing;
- the second countering spring is mounted in the casing so as to axially bias the first indexing disc and the ball-carrying disc one against the other;
- the ball, projecting axially from the groove on the ball-carrying disc, is engaged in the recess on the first indexing disc.

It should be noted that the axial, radial and circumferential indications always refer, in the present patent text, to the axis of rotation of the cable-winding bobbin.

The engagement between the indexing disc and the ball-carrying disc is what defines the predetermined positions that the cable-winding bobbin must take up. Such engagement is obtained in a simple and extremely effective and precise manner through the ball and its engagement in the groove on the ball-carrying disc on the one hand and in the recess on the indexing disc on the other hand.

Preferably, to obtain the asymmetric behavior forming the basis of the invention, an intermediate stop zone is defined by a stop wall orientated according to a sliding direction (S), the stop direction (T) and sliding direction (S) of the same stop zone defining an acute angle (β) that does not enclose the main axis (B) of the device.

In such a way, the stop wall is undercut with respect to the radial direction, i.e. the direction of such a wall makes an acute angle (small in size, slightly more than zero is sufficient) with respect to the radial direction, and such an acute angle faces backwards with respect to the relative movement of the ball that thrusts in the circumferential direction on such a wall. Such an orientation prevents the ball thrusted circumferentially on the wall by a rotation action of the bobbin being able to move.

Preferably, a sliding wall extends along the direction of sliding from the stop zone for the entire adjacent sliding zone.

In such a way, the direction of such a wall makes an acute angle with respect to the radial direction, and such an acute angle faces forwards with respect to the relative movement of the ball that thrusts in the circumferential direction on such a wall. Such an orientation allows the ball thrusted circumferentially on the wall by a rotation action of the bobbin to follow the wall itself, moving in the groove towards the inside of the ball-carrying disc.

Preferably, the stop walls are fitted to the sliding walls in a succession that forms an outer peripheral margin of the recess on the indexing disc. Such a recess may or may not be defined towards the inside by an inner peripheral margin corresponding to the outer peripheral margin; such an inner margin, however, is not operative.

Preferably, two opposite indexing discs can be provided, which together cooperate with the ball-carrying disc at opposite sides thereof. For such a purpose, therefore:
- the groove in the ball-carrying disc is open on both sides of such a disc and has a depth such that the ball projects in the axial direction from the ball-carrying disc, from both sides thereof; in which
- the indexer assembly also comprise a second indexing disc integral in rotation with the first indexing disc, mounted in the casing in a position facing and adjacent to the ball-carrying disc at the opposite side with respect to the first indexing disc and provided with a recess specularly corresponding to that of the first indexing disc; and in which
- the ball, projecting axially from the groove on the ball-carrying disc, is engaged both in the recess on the first indexing disc, and in the recess on the second indexing disc.

The presence of two indexing discs ensures more balance and more effectiveness for the device.

Equally, more balance and more effectiveness are preferably obtained by using not a single ball but two balls, operating substantially in parallel and preferably in 180° opposite positions. The use of a greater number of balls is also theoretically possible and advantageous, of course provided that there is sufficient angular space to house the necessary recesses on the indexing discs; this means that the complete stroke of the control cable between the extreme positions of the derailleur must be obtainable with a rotation of the cable-winding bobbin of less than 120° (to be able to provide three balls) or even less than 90° (for four balls), or else that a transmission with a ratio different from 1:1 between the rotation of the bobbin and the relative angular displacement between ball-carrying disc and indexing disc (or discs) is provided, or else that staggered action planes be provided for different balls.

Preferably, the first countering spring can be simply a helical spring compressed between the ball and an abutment on the ball-carrying disc, or else a flat spring (or leaf spring) suitably anchored on such a disc; in the case in which two opposite balls are used, it is preferred to use a single suitably shaped flat spring arranged between the two balls. These solutions are effective and constructively simple.

Preferably, the second countering spring is a Belleville washer, which thanks to its modest bulk in the axial direction allows the size of the actuation device to be kept sufficiently low, whilst still providing an elastic action even of a very high intensity.

Description

Figure 2:
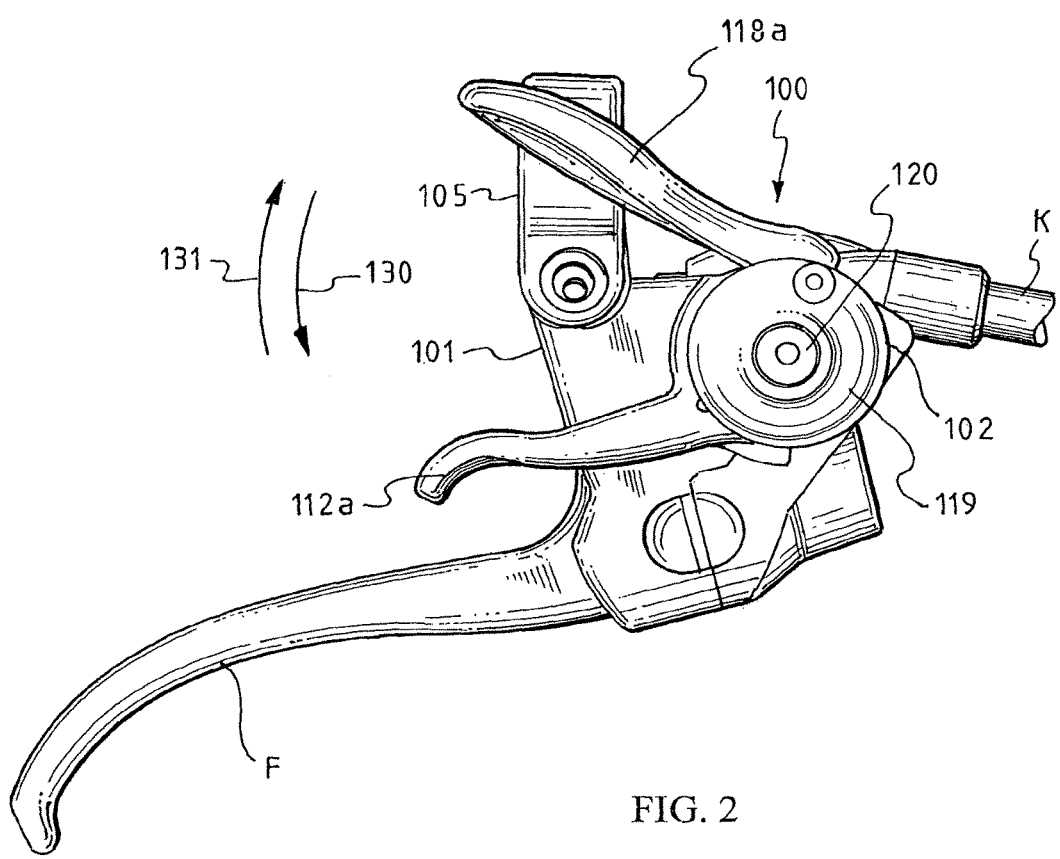
FIG. 2 is a view from below of the device of FIG. 1, without handlebars.

FIGS. 1 to 9 show, as a first embodiment of the invention, an actuation device 100 of the control cable K of a front gearshift. With particular reference to FIGS. 1 and 2, the device 100 is mounted near to the left grip MS of a bicycle handlebar M; the handlebar M shown is a straight handlebar, normally used for mountain bikes. As stated, of course, the embodiment of the invention of the device 100 is not limited to application to such a handlebar, nor to the arrangement on the left thereof.

Figure 3:
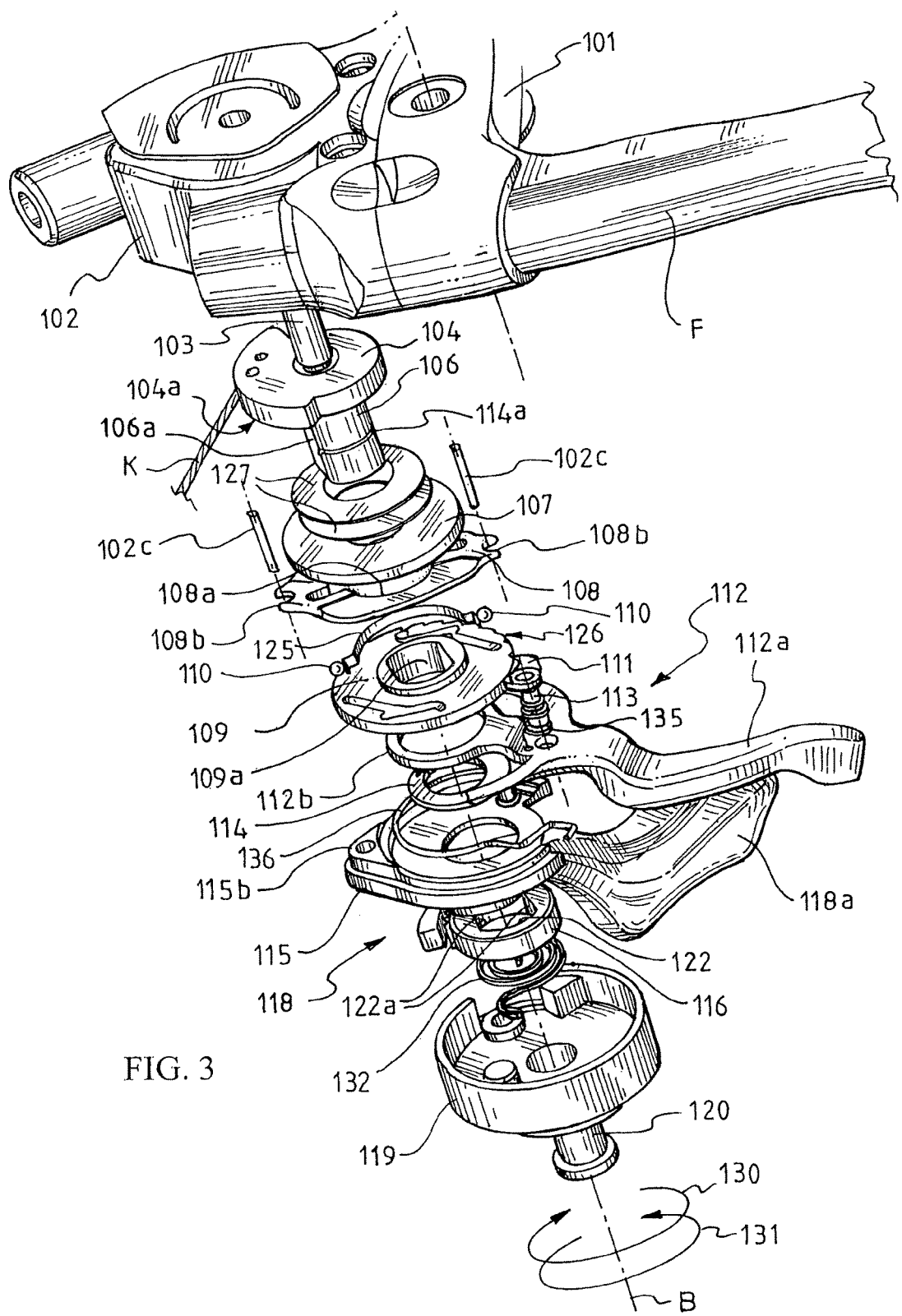
FIG. 3 is an exploded perspective view from above of the device of FIG. 1.
Figure 4:
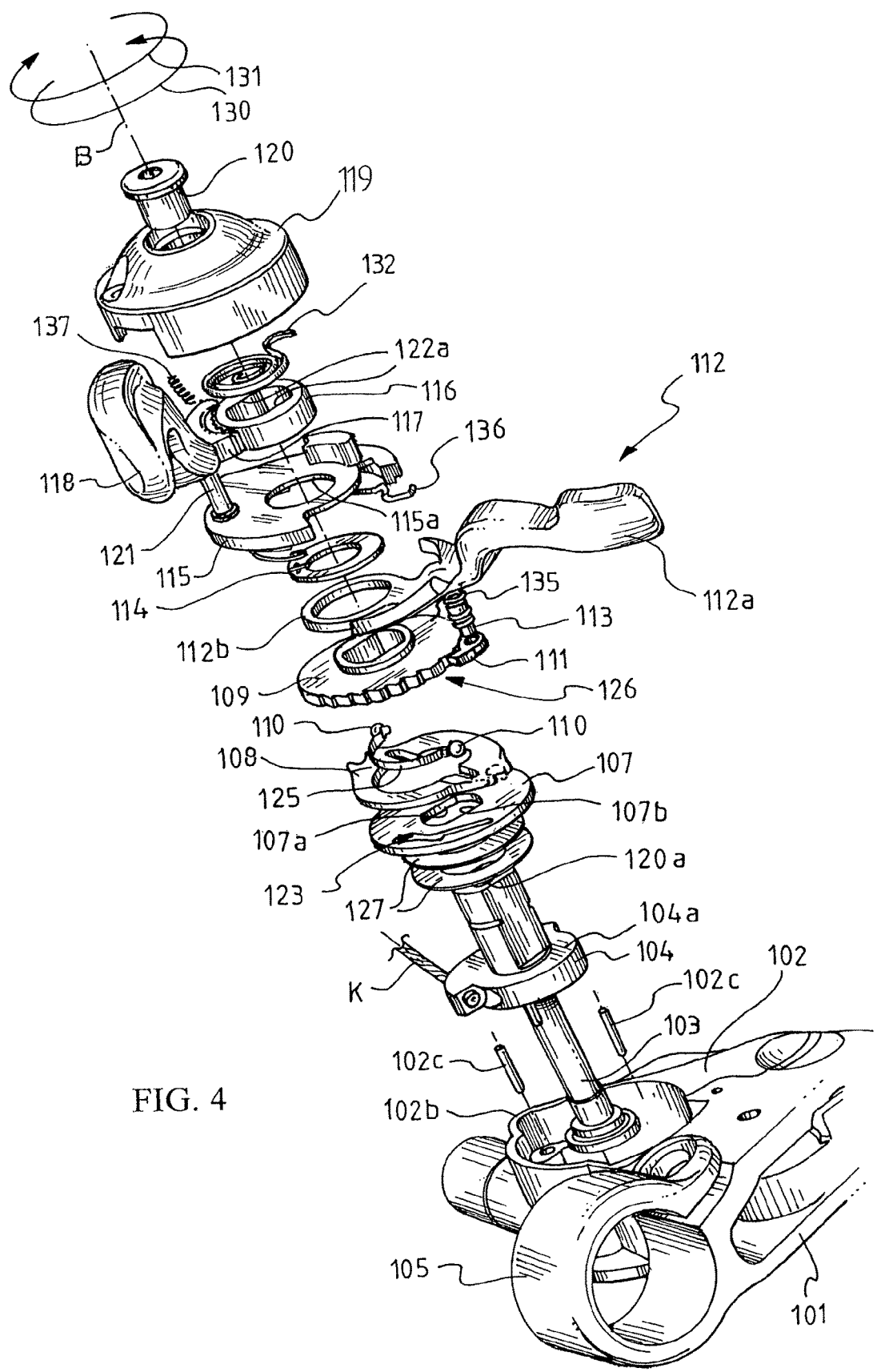
FIG. 4 is an upside down exploded perspective view from below of the device of FIG. 1.
Figure 5:
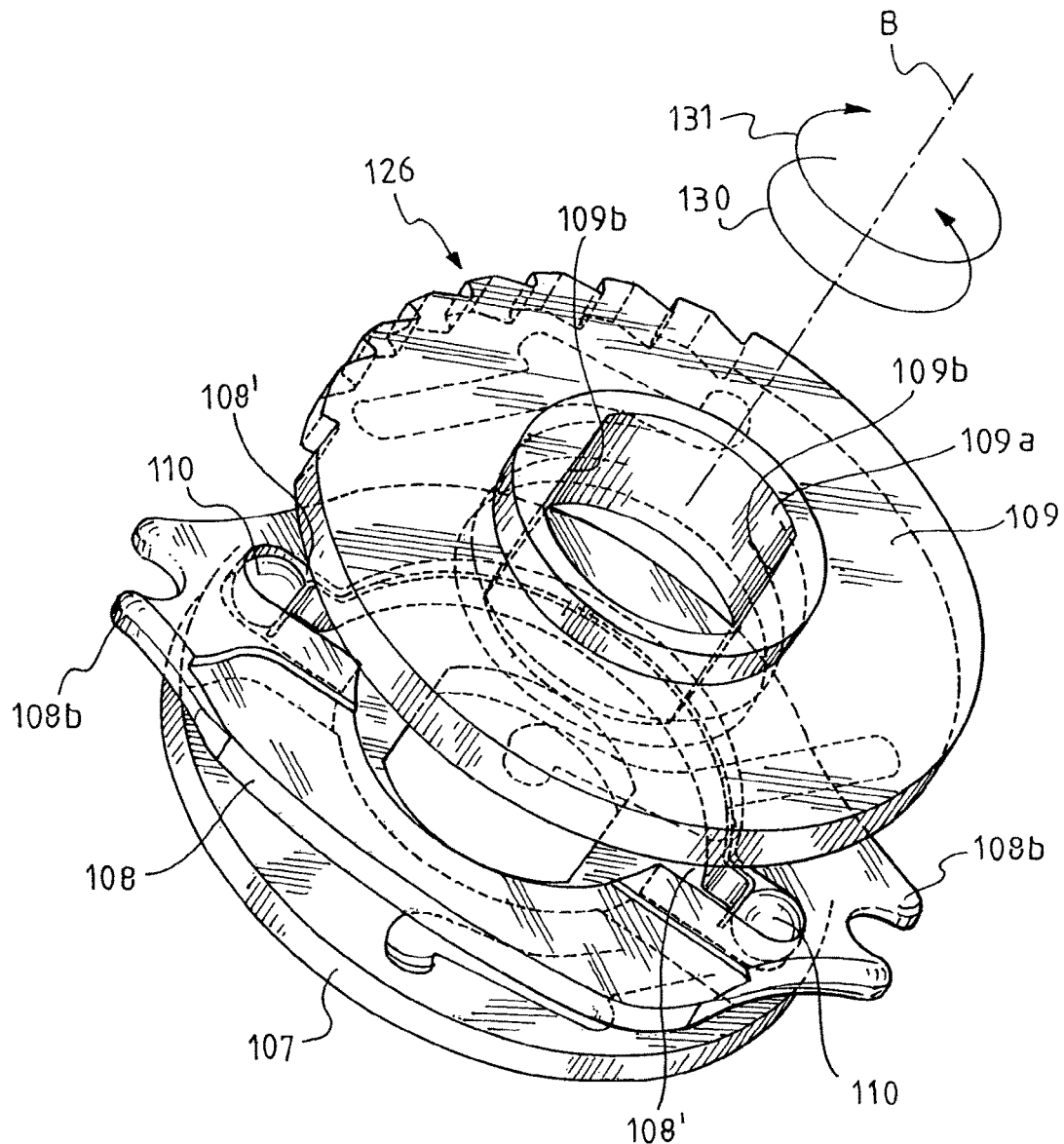
FIG. 5 is a perspective view of some details of the device of FIG. 1.

With particular reference to FIGS. 3 and 4, the device 100 comprises a casing 102, that is fixed to the handlebar M in a conventional manner, for example through a support 101 with a band 105.

In the casing 102 a central shaft 103 is provided, fixed with respect to the casing 102 and extending along an axis B. The axis B is—as shall become clear hereafter—the main reference axis for the elements that form part of the device 100; with respect to it, all of the indications of direction and the like, such as "axial", "radial", "circumferential", "diametric", shall be referred; equally, the indications "outwards" and "inwards" referring to radial directions must be understood as away from axis B or towards axis B. About the axis B, two opposite angular directions are also defined, indicated with 130 and 131, the first in a clockwise direction, the second in an counter-clockwise direction, observing the device 100 from above; nevertheless, it should be noted that in the plan views (FIGS. 2, 6a, 6b) as well as in most of the perspective views (FIGS. 4, 5, 7) the device 100 is seen from below.

On the shaft 103 a cable-winding bobbin 104 is mounted for free rotation, to which the cable K to be actuated is attached and around which it is wound. The bobbin 104 is provided with a shank 106, realized in one piece or in any case integrally, which has a non-symmetrical shape, for example cylindrical with two leveled walls 106a, so as to be able to fit elements thereto that must be integral in rotation with the bobbin 104.

On the shank 106, indeed, a first indexing disc 107 is fitted integral in rotation, provided for this purpose with a central hole 107a with a shape matching the section of the shank 106, i.e. cylindrical-shaped with two flat walls 107b. Between the first indexing disc 107 and the bobbin 104 at least one Belleville washer 127 is arranged (in the illustrated example there are two facing Belleville washers 127), compressed in the axial direction.

Again on the shank 106, a ball-carrying disc 108 is also mounted; this disc 108, however, is not fitted integral in rotation on the shank 106 and thus with the bobbin 104, but is, on the other hand, provided with a central hole 108a that does not interfere with the shank 106. Vice-versa, the ball-carrying disc 108 is mounted locked in rotation in the casing 102, thanks to two opposite radially projecting ears 108b, which engage in corresponding seats 102b in the casing 102, on pins 102c fixed to the casing 102.

Again on the shank 106 a second indexing disc 109 is thus fitted, which—like the disc 107—is provided with a central hole 109a with a shape matching the section of the shank 106, or else cylindrical-shaped with two flat walls 109b.

The discs 107, 108 and 109, together with the surrounding elements that cooperate with them, like for example the springs 127, the seats 102b, the walls 106b, form indexer assembly for the device 100.

A driving mechanism 112 for downward gearshifting is also provided, with an actuation lever 112a provided with a ring-shaped inner portion 112b rotatably fitted on the shank 106 and is held here in the axial direction by an elastic retention ring 114 (of the type commonly known as Seger ring), inserted in a corresponding annular seat 114a formed on the shank 106. The mechanism 112 is a per se conventional ratchet gear mechanism and comprises a first ratchet 111, which is supported by a pin 113 mounted on the lever 112a and engages in operation with a toothed sector 126 of the disc 109; a closing spring 135 cooperates with the ratchet 111, thrusting it towards an approach position to the toothed sector 126, a position in which the ratchet 111 does not engage the toothed sector 126 when the lever 112a is in a rest position, whereas it engages it as soon as the lever 112a is actuated to carry out downward gearshifting. Finally, a return spring 136 is provided for the lever 112a.

Furthermore, a driving mechanism 118 is provided for upward gearshifting, with an actuation lever 118a. The mechanism 118 is also a per se conventional ratchet gear mechanism and comprises a plate 115 mounted on the shank 106, provided with a central hole 116a sufficiently wide as not to interfere with the shank 106 and locked in rotation in the casing 102, thanks to a radially projecting ear 115b, which engages in one of the seats 102b formed inside the casing 102. The plate 115 carries a pin 121 on which both the lever 118a, and a second ratchet 117 are hinged; in operation the ratchet 117 engages with a toothed bobbin 116, fitted integral in rotation on the shank 106 of the bobbin 104 thanks to a central hole 122 with a shape matching the section of the shank 106, i.e. cylindrical-shaped with two flat walls 122a; an opening spring 137 cooperates with the ratchet 117, thrusting it towards an approach position to the toothed bobbin 116, a position in which the ratchet 117 does not engage the toothed bobbin 116 when the lever 118a is in a rest position, whereas it engages it as soon as the lever 118a is actuated to carry out upward gearshifting. Finally, a return spring 132 for the lever 118a is provided.

Finally, again on the shank 106, a cover 119 is mounted, held by a screw 120 screwed into a corresponding hole 120a, formed axially in the shank 106.

The indexer assembly of the device 100 are described hereafter, with particular reference to FIGS. 5 to 9.

In the ball-carrying disc 108 two radial grooves 108' are formed, closed towards the outside, the same as each other and diametrically opposite, in each of which a respective ball 110 is housed mobile; the two balls 110 are elastically biased outwards in the grooves 108' by a single flat spring 125, mounted on the disc 108. The grooves 108' are open on both sides of the disc 108, which has a smaller thickness than the diameter of the balls 110 which thus project from it in the axial direction, as can clearly be seen in FIGS. 8 and 9.

In the indexing disc 107 two recesses 123 are formed that are the same as each other and point for point diametrically opposite; two specularly identical recesses (again indicated with reference numeral 123) are formed in the indexing disc 109.

Each recess 123 has a width and depth such as to receive the balls 110, or rather the portion of such balls 110 that projects from the groove 108' of the disc 108, and is arranged according to a path that comprises three stop zones $124^{I}$, $124^{II}$, $124^{III}$ alternating with two sliding zones $134^{I}$ and $134^{II}$. In such a way, the balls 110 are engaged by a first part with a stationary member in the casing 102, formed by the ball-carrying disc 108 with its grooves 108', by a second part with a rotating member integral in rotation with the cable-winding bobbin 104, formed by the indexing discs 107 and 108 with their recesses 123.

The intermediate stop zone $124^{II}$ is defined by a stop wall $124^{II}a$ and by a sliding wall $134^{II}a$, extending the first along a stop direction (indicated with T in FIG. 6b), the second along a sliding direction (indicated with S). The stop direction T and sliding direction S define an acute angle β between them that does not enclose the radial direction R passing by the stop zone $124^{II}$, i.e. the main axis B of the device 100. The stop wall $124^{II}a$ is thus undercut with respect to the radial direction R. The sliding wall $134^{II}a$ extends along the sliding direction S from the stop zone $124^{II}$ for the entire sliding zone $134^{II}$ adjacent to it.

The recesses 123 are closed at the ends, as well as towards the inside; they are thus defined by a continuous outer peripheral margin, regularly indented due to the presence of the succession of stop zones and sliding zones, and by an analogous inner margin.

The first stop zone $124^{I}$ is defined by the initial end $123a$ of the recess 123 and by a sliding wall $134^{I}a$, extending along a sliding direction for the entire adjacent sliding zone $134^{I}$.

The last stop zone $124^{III}$ is defined by a stop wall $124^{III}a$ and by the end point $123b$ of the recess 123. The stop wall $124^{III}a$ is thus undercut with respect to the radial direction R.

The fact that there are three stop zones means (as shall be seen more clearly hereafter, when the operation will be described) that the illustrated device 100 is intended for a gearshift with three ratios. Should it be necessary to operate on a gearshift with a different number of ratios (front gearshift with two, four or more crowns, or else rear gearshift with two, four or more sprockets), an equal number of stop zones must be provided. Clearly, there would in any case remain a first and a last stop zone, with a suitable number of intermediate stop zones in between.

The operation of the device 100, with particular reference to its indexer assembly, is the following.

In static conditions of the device, when the cyclist does not act upon it, the ratio of the gearshift previously set must be maintained (for example the intermediate one), i.e. the cable K must neither be wound upon nor unwound from the bobbin 104. In other words, the bobbin 104 must not rotate, even if subjected to the traction applied on the cable K by the return spring present in the gearshift, which would tend to make the bobbin 104 rotate in direction 131, as well as knocks and bangs caused by the ride of the bicycle, which can clearly act in any direction.

This is obtained thanks to the indexer assembly. The rotation of the bobbin 104 is prevented by the fact that the balls 110 on one side are blocked in the grooves 108', and thus prevented from any displacement that is not in the radial direction, and on the other side engaged in stop zones of the recess 123.

Figure 8:
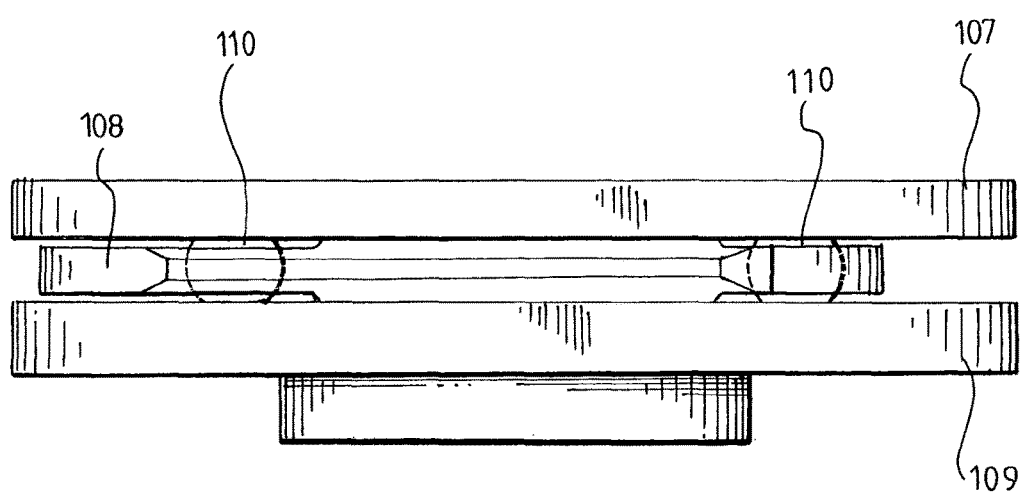
FIG. 8 is a side view of the details of FIG. 5, in an operating condition.
Figure 9:
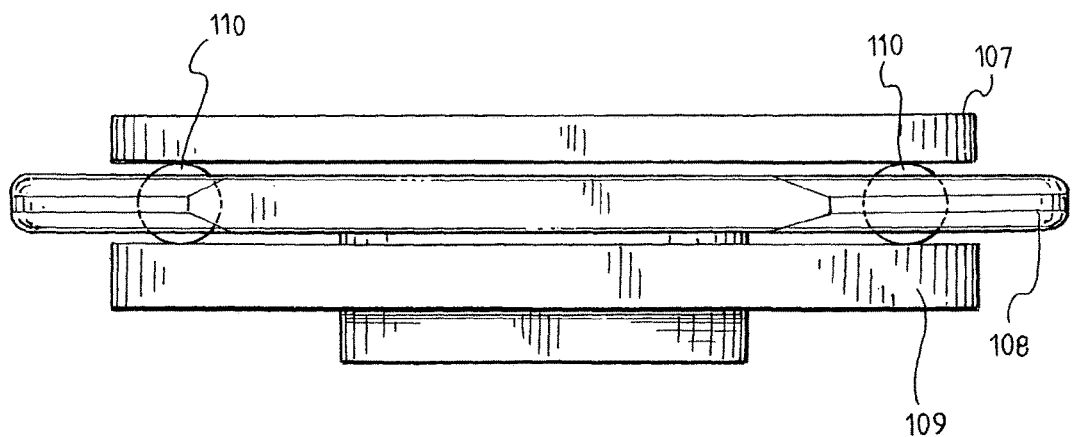
FIG. 9 is a side view analogous to FIG. 8, with the same details in a different operating condition.

The traction transmitted by the cable K ensures that each stop wall $124^{II}a$ thrusts in direction 131 against the ball 110, but the undercut orientation of such a wall ensures that such a thrust cannot displace the ball 110, blocked in the stop zone $124^{II}$. This condition determines an axial thrust on the indexing discs 107 and 109 in the direction of their separation, prevented, however, by the springs 127; therefore, the springs 127 must be sized in such a way that the axial thrust applied by them is sufficient to avoid the moving apart of the two indexing discs 107 and 109. This closed condition of the indexing discs 107 and 109 is illustrated in FIG. 8; the position of the balls 110 in the stop zones can thus be defined a stop position, since in such a position the balls make the discs 107, 108 and 109 integral in rotation.

Stresses in the opposite direction due to knocks or the like could, on the other hand, have the sliding walls $134^{II}a$ thrust upon the balls 110 in direction 130. Such a thrust tends to thrust the balls 110 towards the inside of the grooves 108', but the movement is prevented by the elastic thrust of the spring 125, which must be suitably sized.

The springs 125 and 127 thus constitute countering members, first and second respectively, to counter the rotation of the cable-winding bobbin 104.

It is now assumed that the cyclist carries out upward gearshifting.

For upward gearshifting, the cyclist acts upon the appropriate lever 118a, pressing it with the thumb of the left hand in the angular direction 130. By doing so, the second ratchet 117 goes into engagement with the toothed bobbin 116, thrusting it into rotation in the angular direction 130 together with the cable-winding bobbin 104, with its shank 106 and with all of the elements fitted integral in rotation with it; in particular, the two indexing discs 107 and 109 are rotated in direction 130.

First of all it should be noted that the first ratchet 111 does not prevent the rotation of the disc 109, since—with the lever 112a not actuated—the ratchet 111 is disengaged from the toothed sector 126 of the disc 109.

To obtain the rotation of the bobbin 104 and of the indexing discs 107 and 109 in the angular direction 130, the cyclist must apply a force large enough so that the balls 110 are thrusted by the sliding walls $134^{II}a$ towards the inside of the grooves 108', overcoming the radial thrust towards the outside of the spring 125. Whilst the action of the cyclist on the lever 118a continues, as the rotation of the bobbin 104 proceeds, the balls 110 then cross the sliding zone $134^{II}$, finally reaching the height of the stop zone $124^{III}$, where they are positioned, thrusted also by the spring 125. In such a position the balls 110 stay, as just described, maintaining the new ratio even after the cyclist has interrupted his action. The released lever 118a goes back into position thanks to the return spring 132.

It may be noted that, substantially during all of the upward gearshifting, the cyclist must overcome both the traction force on the cable K applied by the return spring of the gearshift, and the counter force applied by the spring 125 on the balls 110.

Preferably, to make upward gearshifting smooth, the counter force applied by the spring 125 on the two balls 110 is relatively low, with values for example of 1/20 of the axial thrust force applied by the springs 127.

In the previous example, in which the starting condition was the intermediate ratio of a device with three ratios, clearly upward gearshifting can only be from such a ratio to a different ratio (that in the exemplified case of a front gearshift is a longer ratio) immediately next to it. On the other hand, in the case in which the starting condition permits it (for example, in the device 100 with three ratios considered, when one starts from the shortest ratio), the action of the cyclist can be applied until double or multiple gearshifting is obtained. In this case, the reaching of the first adjacent ratio shall be perceived by the cyclist as a momentary reduction in the force required by gearshifting, due to the fact that at the moment of the displacement of the balls 110 from the sliding zone $134^{I}$ to the stop zone $124^{II}$ the spring 125 operates not against but helping the cyclist, thrusting the balls 110 radially outwards; at such a moment, the cyclist can decide to keep such a ratio and thus interrupt his/her action by releasing the lever 118a, or else can proceed with his/her action until the subsequent ratio is obtained.

Figure 6A:
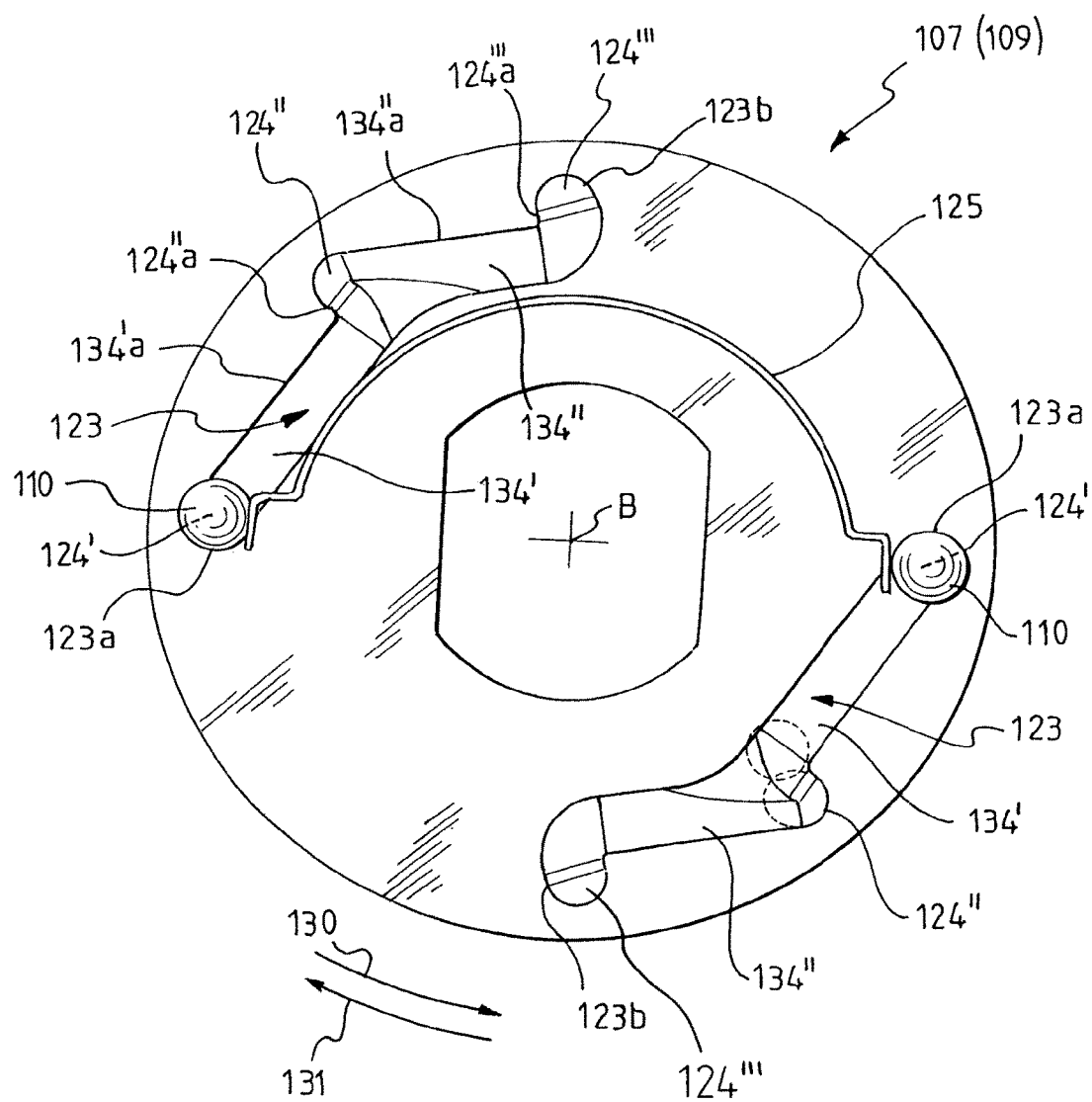
FIG. 6a is a plan view of some details of the device of FIG. 1.
Figure 6B:
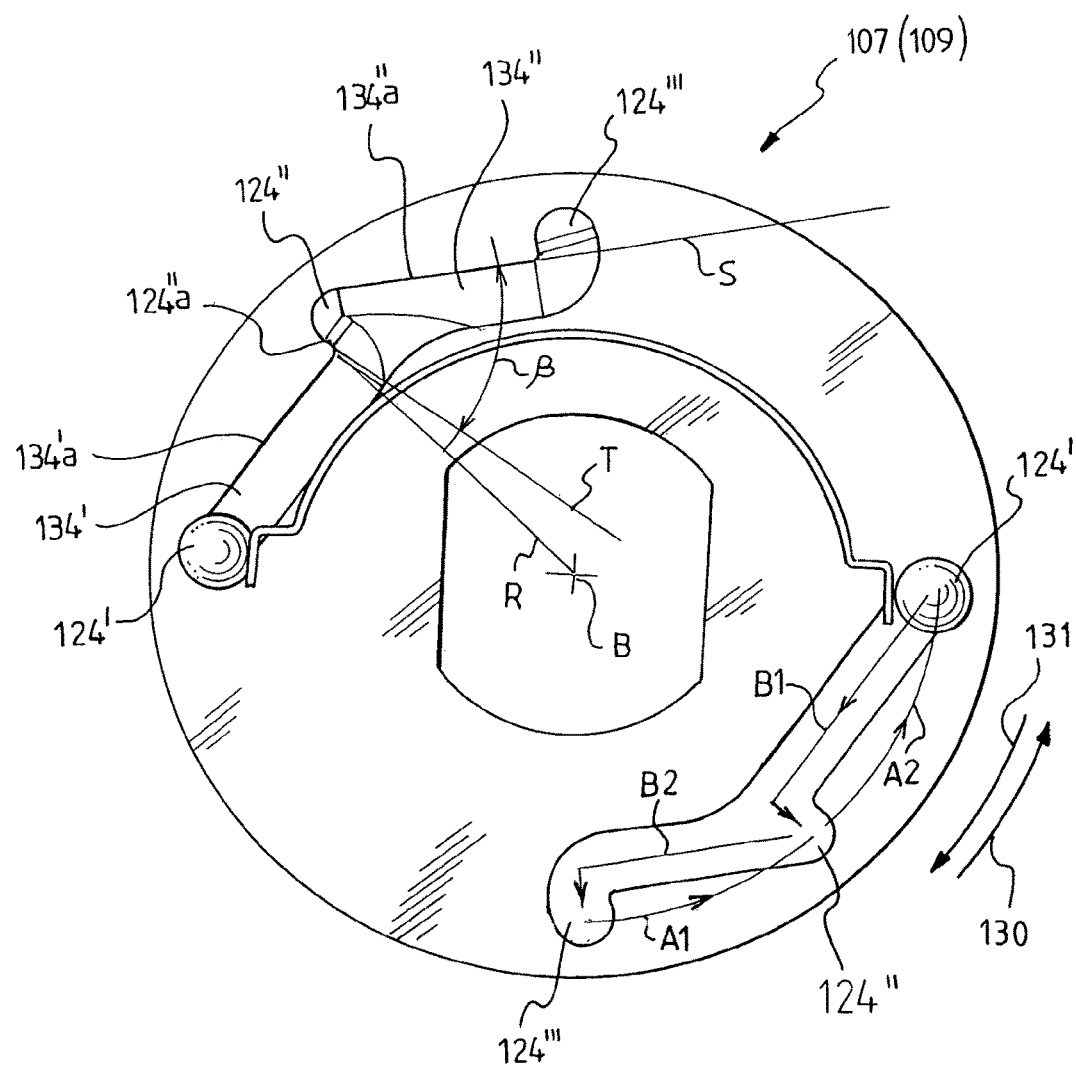
FIG. 6b is a plan view analogous to FIG. 6a, with some further details of the device of FIG. 1 highlighted.
Figure 7:
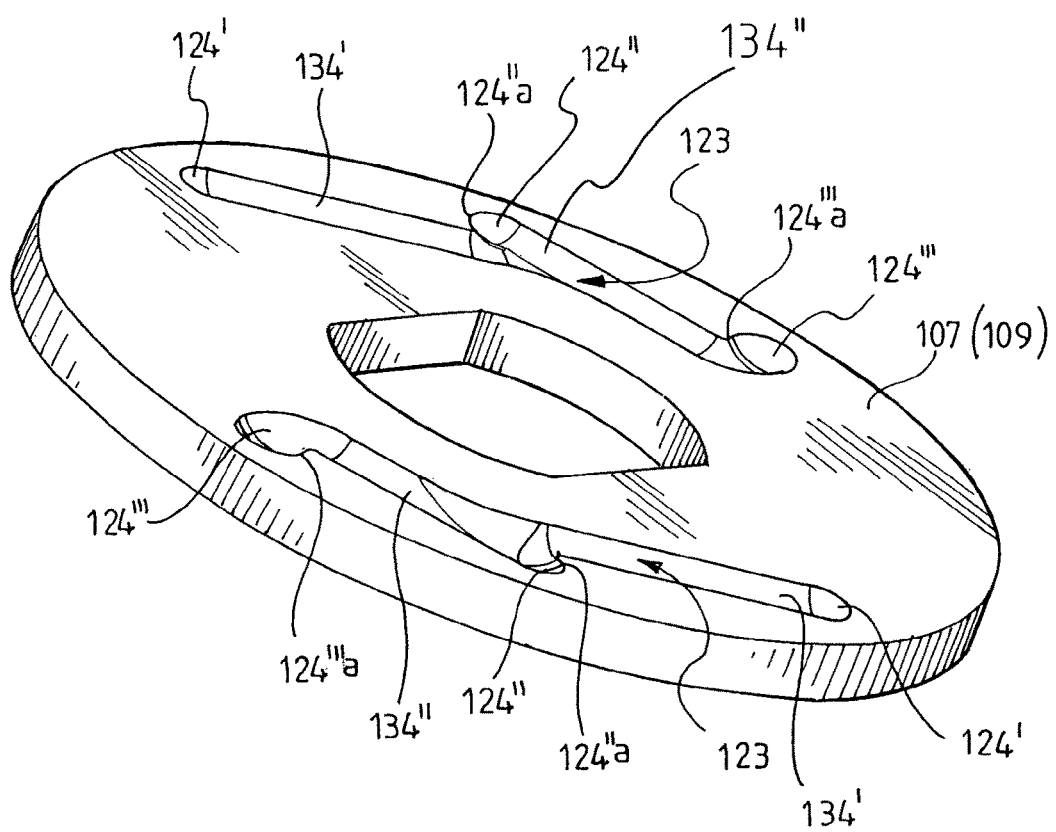
FIG. 7 is a perspective view of a detail of the device of FIG. 1.

In FIG. 6b, the relative paths of one of the balls 110 in the recess 123 are indicated with B1 and B2, during upward gearshifting from the lower ratio to the intermediate ratio (B1) and from the intermediate ratio to the higher ratio (B2).

For downward gearshifting, for example starting from the intermediate ratio, the cyclist acts, conversely, on the lever 112a, pulling it with the index finger in the angular direction 131. By doing so the first ratchet 111 goes into engagement with the toothed sector 126 of the indexing disc 109, thrusting the bobbin 104 into rotation in the angular direction 131 together with its shank 106 and with all of the elements fitted integral in rotation with it; in particular, the indexing disc 107 and the toothed bobbin 116 are rotated in direction 131.

It should first of all be noted that the second ratchet 117 does not prevent the rotation of the toothed bobbin 116, since—with the lever 118a not actuated—the ratchet 117 is disengaged from the toothed bobbin 116.

During this action of the cyclist, the balls 110 cannot cross the path B1 in the recess 123 backwards, due to the undercut stop walls 124$^H$a of the stop zones 124$^H$. In these conditions, on the other hand, the action of the cyclist ensures that the balls 110 thrust upon the stop walls 124$^H$a causing an axial thrust upon the indexing discs 107 and 109 in the direction of their separation, against the springs 127. If the cyclist applies sufficient traction to overcome the counter action of the axial springs 127, the indexing discs 107 and 109 go from the closed condition of FIG. 8 to the open condition of FIG. 9. In such a condition, the balls 110 thus go out from the recess 123 and, due to the engagement in the grooves 108' which prevents a further radial displacement outwards, follow the arc of circumference path A2 up to the stop zone 124$^I$, where they position themselves under the axial thrust of the springs 127. In such a position the balls 110 stay, as just described, maintaining the new ratio even after the cyclist has interrupted his action. The released lever 112a goes back into position thanks to the return spring 136.

Also in downward gearshifting, in the same way as what has been seen for upward gearshifting, multiple gearshifting is possible.

It may be noted that, substantially during all of the downward gearshifting, the cyclist has the help of the traction force on the cable K applied by the return spring of the gearshift, but must overcome both the counter force applied by the springs 127 on the discs 107 and 109 (in the initial step of gearshifting), and (during the entire gearshifting) the friction between the balls 110 and the two discs 107 and 109. It should be noted that this friction, although in the presence of balls, is substantially sliding and not rolling friction, since the coupling of each ball on the disc 107 is opposite that on the disc 109, so that the rotation of the balls 110 is actually prevented. The value of this friction can be suitably chosen by the sizing of the springs 127 which determine the force with which the discs 107 and 109 are pressed axially one towards the other; in such a way, it is possible in particular to ensure that such a friction force balances and overcomes the return force applied by the spring of the gearshift through the cable K, so as to have an active gearshift control.

Figure 10:
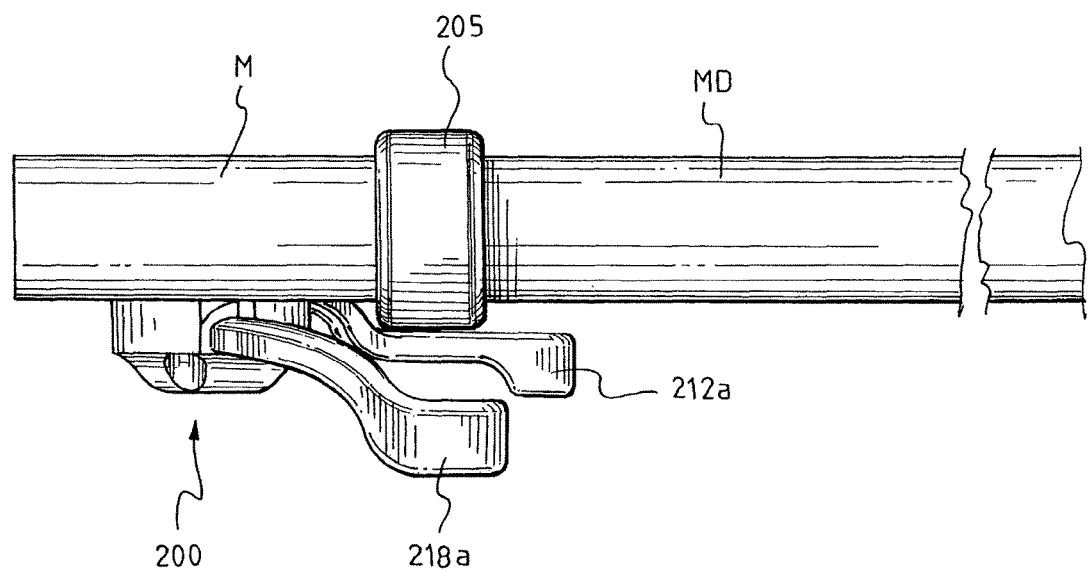
FIG. 10 is a view of an actuation device of the control cable of a rear gearshift (right device), mounted on a straight handlebar, from the observation point of the cyclist.
Figure 11:
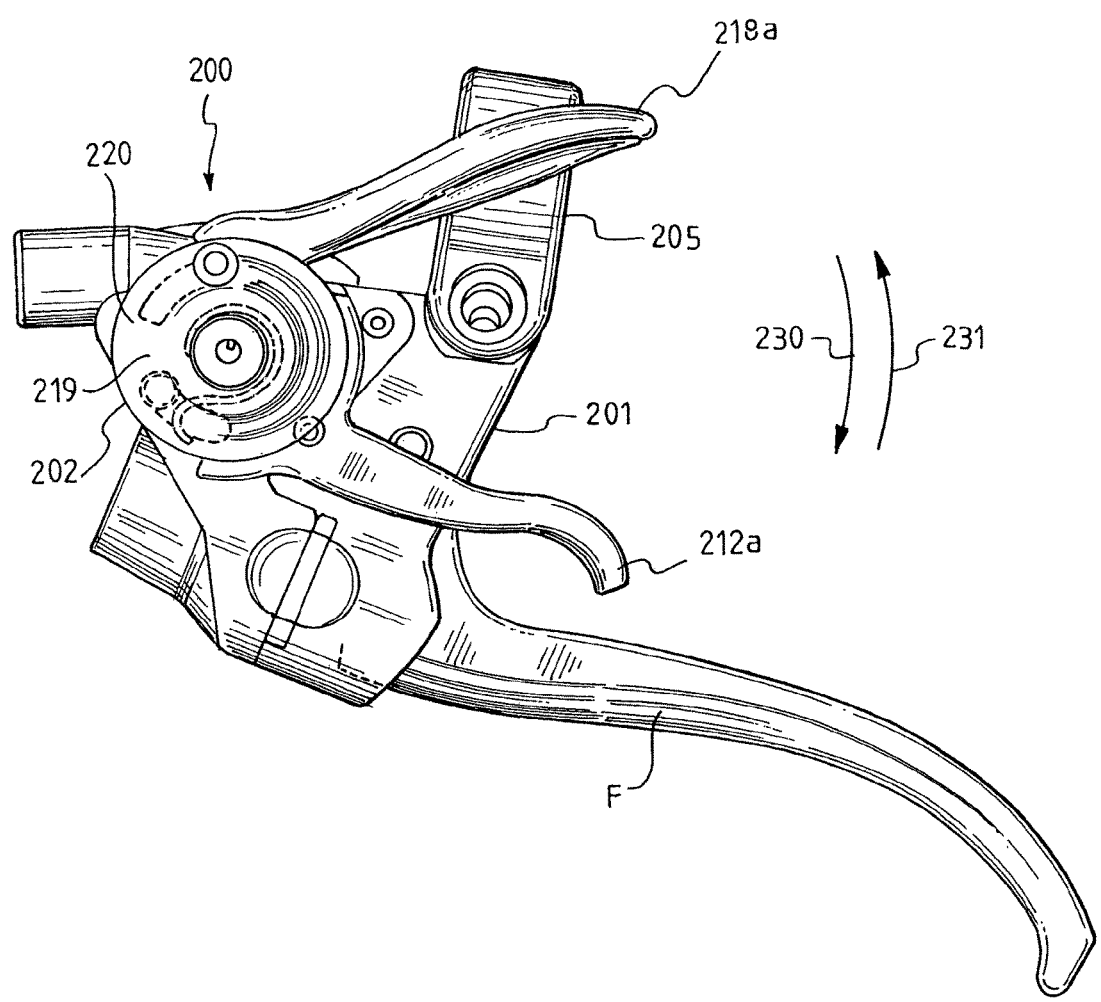
FIG. 11 is a view from below of the device of FIG. 10, without handlebars.
Figure 12:
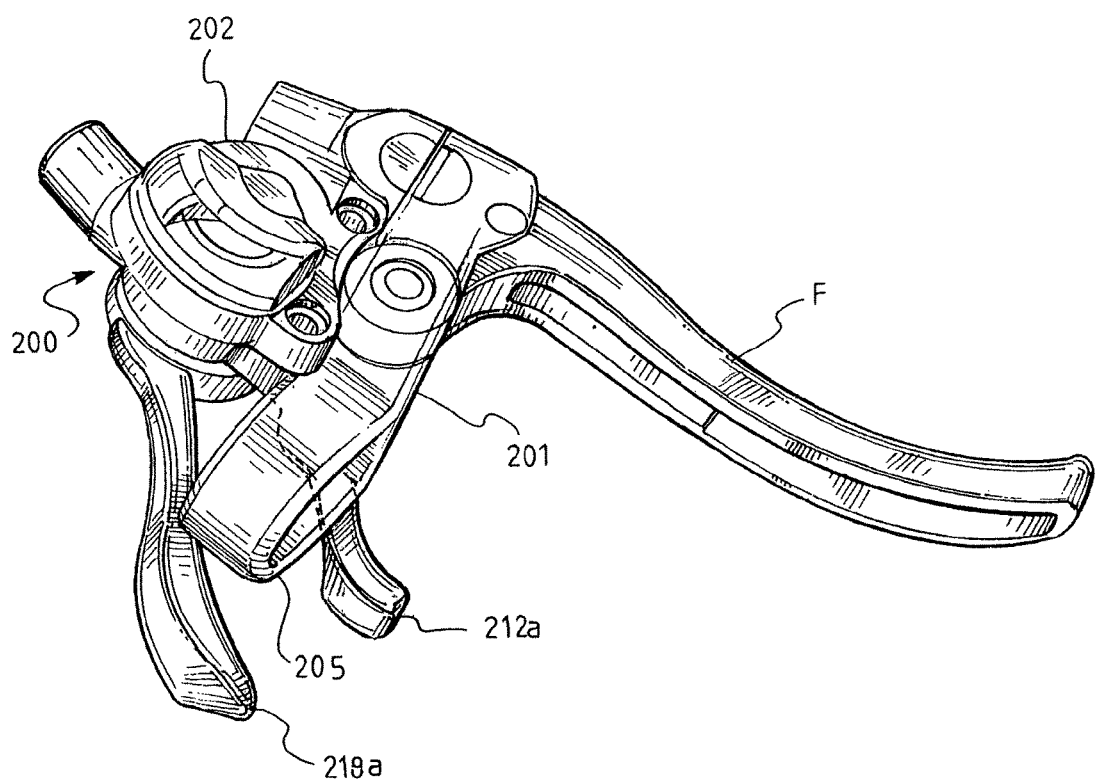
FIG. 12 is a perspective view from above of the device of FIG. 10, without handlebars.

FIGS. 10 to 17 show, as a second embodiment of the invention, an actuation device 200 of the control cable K of a rear gearshift (not shown). With particular reference to FIGS. 10, 11 and 12, the device 200 is mounted near to the right grip MD of a bicycle handlebar M; the handlebar M shown is also in this case a straight handlebar, normally used for mountain bikes. As stated for the device 100, of course, the embodiment of the invention of the device 200 is also not limited to application to such a handlebar, nor to arrangement on the right thereof.

Figure 13:
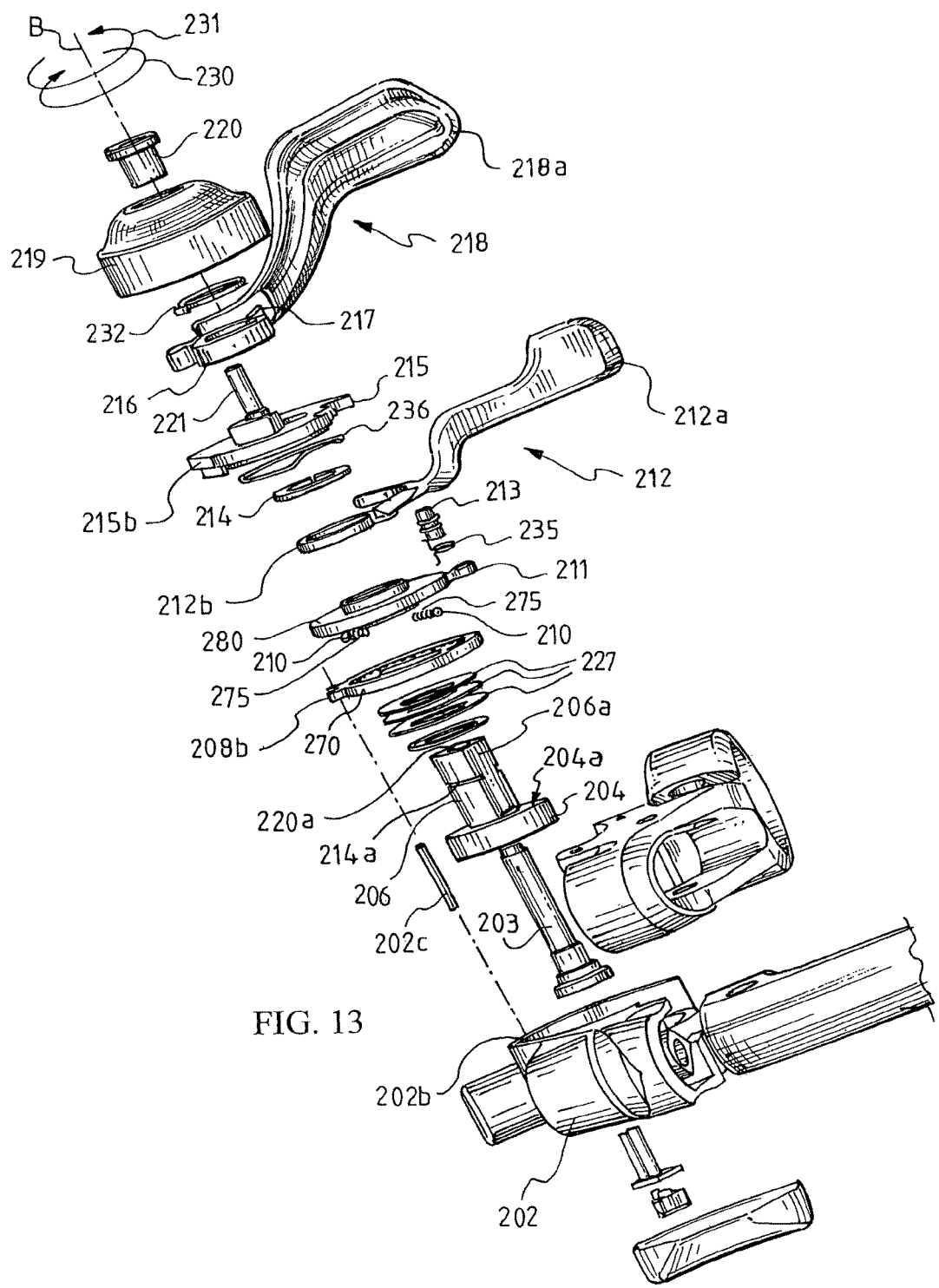
FIG. 13 is an upside down exploded side perspective view of the device of FIG. 10.

With particular reference to FIG. 13, the device 200 comprises a casing 202, which is fixed to the handlebar M in a conventional manner, for example through a support 201 (which in the illustrated example also carries a brake lever F, outside of the invention and thus not described) with a band 205.

In the casing 202 a central shaft 203 is provided, fixed with respect to the casing 202 and extending along an axis B. The axis B is—like in the case of the embodiment of the device 100—the main reference axis for the elements that form part of the device 200; with respect to it, all of the indications of direction and the like, such as "axial", "radial", "circumferential", "diametric", shall be referred; equally, the indications "outwards" and "inwards" referring to radial directions must be understood as away from axis B or towards axis B. About the axis B, two opposite angular directions are also defined, indicated with 230 and 231, the first in an counter-clockwise direction, the second in a clockwise direction, observing the device 200 from above; nevertheless, it should be noted that in the plan views (FIGS. 11 and 15 to 17) as well as in most of the perspective views (FIGS. 13, 14) the device 200 is seen from below.

On the shaft 203 a cable-winding bobbin 204 is mounted for free rotation, to which the cable K to be actuated is fixed and on which it is wound. The bobbin 204 is provided with a shank 206, realized in one piece or in any case integrally, which has a non-symmetrical shape, for example cylindrical with two leveled walls 206a, so as to be able to fit elements thereto that must be integral in rotation with the bobbin 204.

An indexing disc 270 is mounted on the shank 206; this disc 270 is not fitted integral in rotation on the shank 206 and thus with the bobbin 204, but is, on the other hand, provided with a wide central hole 208a which does not interfere with the shank 206. Vice-versa, the indexing disc 270 is mounted locked in rotation in the casing 202, thanks to a radially projecting ear 208b, which engages in a corresponding seat 202a in the casing 202, on a pin 202c fixed to the casing 202. Between the indexing disc 270 and the bobbin 204 at least one Belleville washer 227 is arranged (in the illustrated example there are three facing springs 227), compressed in the axial direction.

Again on the shank 206 a ball-carrying disc 280 is also fitted integral in rotation, provided for the purpose with a central hole 280a with a shape matching the section of the shank 206, i.e. cylindrical-shaped with two flat walls 280b.

The discs 270 and 280, together with the surrounding elements that cooperate with them, like for example the springs 227, the seat 202b, the walls 280b, form indexer assembly for the device 200.

A driving mechanism 212 for downward gearshifting is also provided, with an actuation lever 212a provided with a ring-shaped inner portion 212b rotatably fitted on the shank 206 and is held here in the axial direction by an elastic retention ring 214 (of the type commonly known as Seger ring), inserted in a corresponding annular seat 214a formed on the shank 206. The mechanism 212 is a per se conventional ratchet gear mechanism and comprises a first ratchet 211, which is supported by a pin 213 mounted on the lever 212a and engages in operation with a toothed sector 276 of the ball-carrying disc 280; a closing spring 235 cooperates with the ratchet 211, thrusting it towards an approach position to the toothed sector 276, a position in which the ratchet 211 does not engage the toothed sector 276 when the lever 212a is in a rest position, whereas it engages it as soon as the lever 212a is actuated to carry out downward gearshifting. Finally, a return spring 236 is provided for the lever 212a.

Furthermore, a driving mechanism 218 is provided for upward gearshifting, with an actuation lever 218a. The mechanism 218 is also a per se conventional ratchet gear mechanism and comprises a plate 215 mounted on the shank 206, provided with a central hole 215a sufficiently wide as not to interfere with the shank 206 and locked in rotation in the casing 202, thanks to a radially projecting ear 215b, which engages in the seat 202b formed inside the casing 202. The plate 215 carries a pin 221 on which both the lever 218a, and a second ratchet 217 are hinged; in operation the ratchet 217 engages with a toothed bobbin 216, fitted integral in rotation on the shank 206 of the bobbin 204 thanks to a central hole 222 with a shape matching the section of the shank 206, i.e. cylindrical-shaped with two flat walls; an opening spring (not highlighted in the figures) cooperates with the ratchet 217, thrusting it towards an approach position to the toothed bobbin 216, a position in which the ratchet 217 does not engage the toothed bobbin 216 when the lever 218a is in a rest position, whereas it engages it as soon as the lever 218a is actuated to carry out upward gearshifting. Finally, a return spring 232 for the lever 218a is provided.

Finally, a cover 219 is mounted on the shank 206, held by a screw 220 screwed into a corresponding hole 220a, formed axially in the shank 206.

Figure 14:
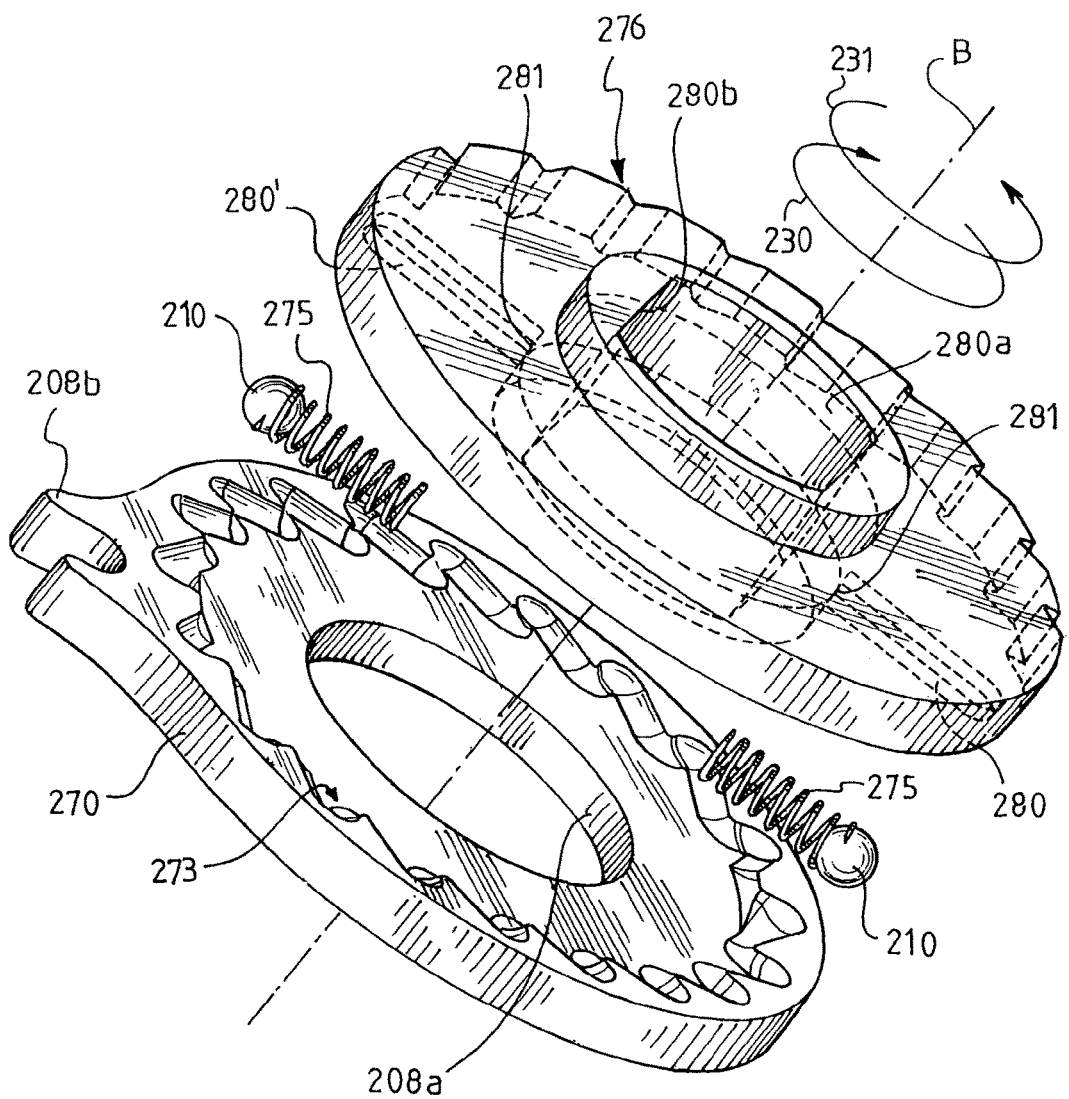
FIG. 14 is a perspective view of some details of the device of FIG. 10.
Figure 15:
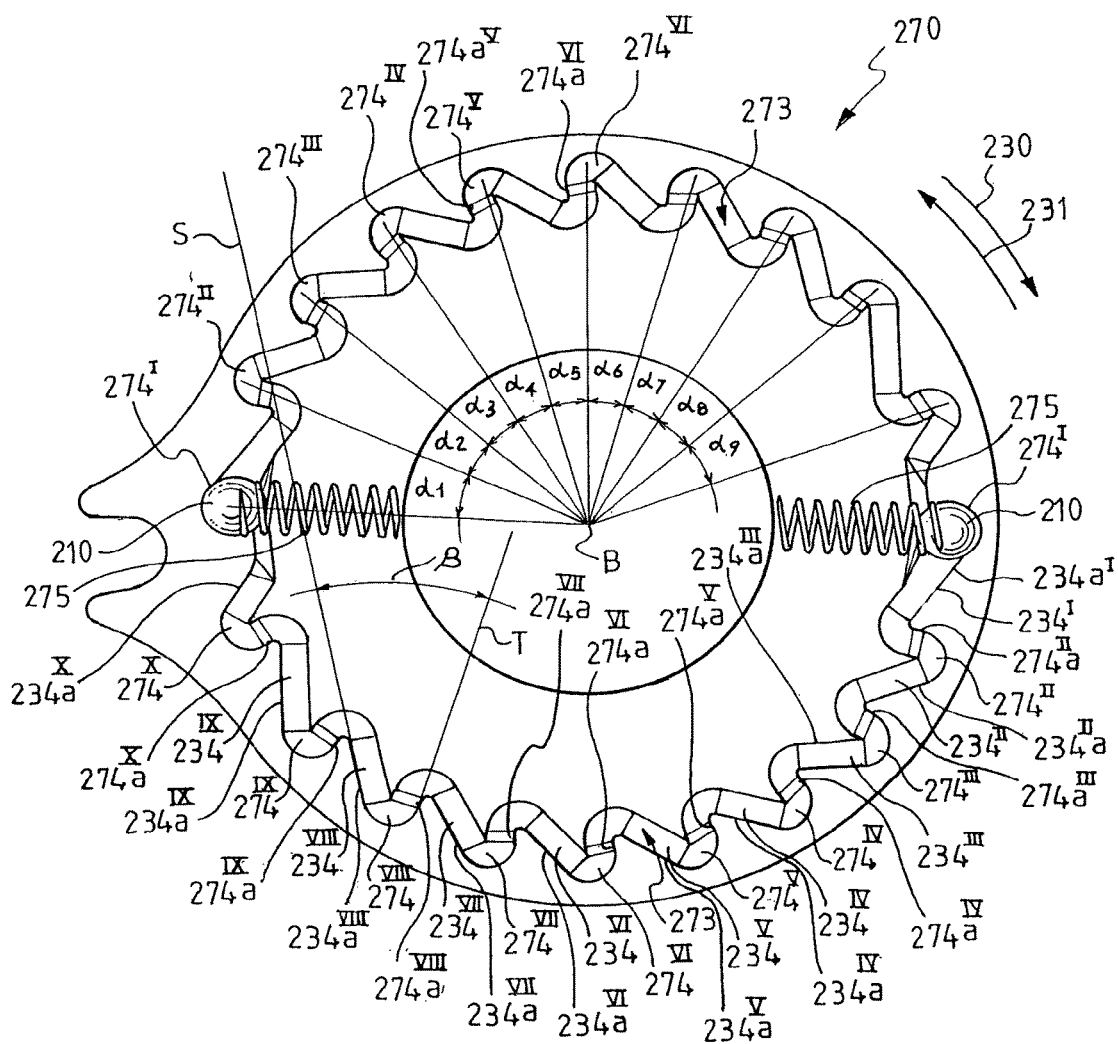
FIG. 15 is a plan view of some details of the device of FIG. 10.
Figure 16:
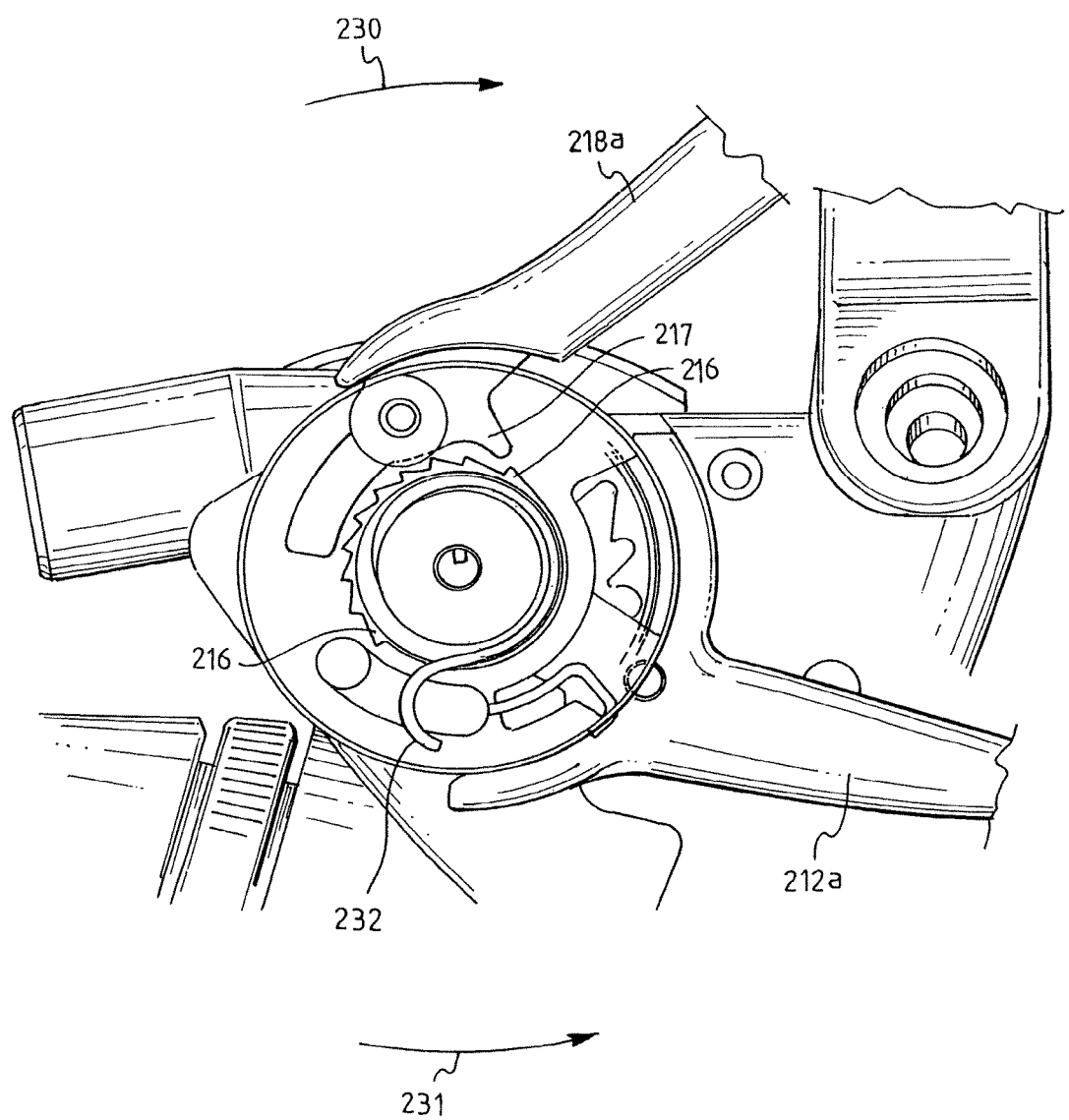
FIG. 16 is a plan view from below, with parts partially removed and sectioned, of some details of the device of FIG. 10, with the upwards actuation lever in rest position.
Figure 17:
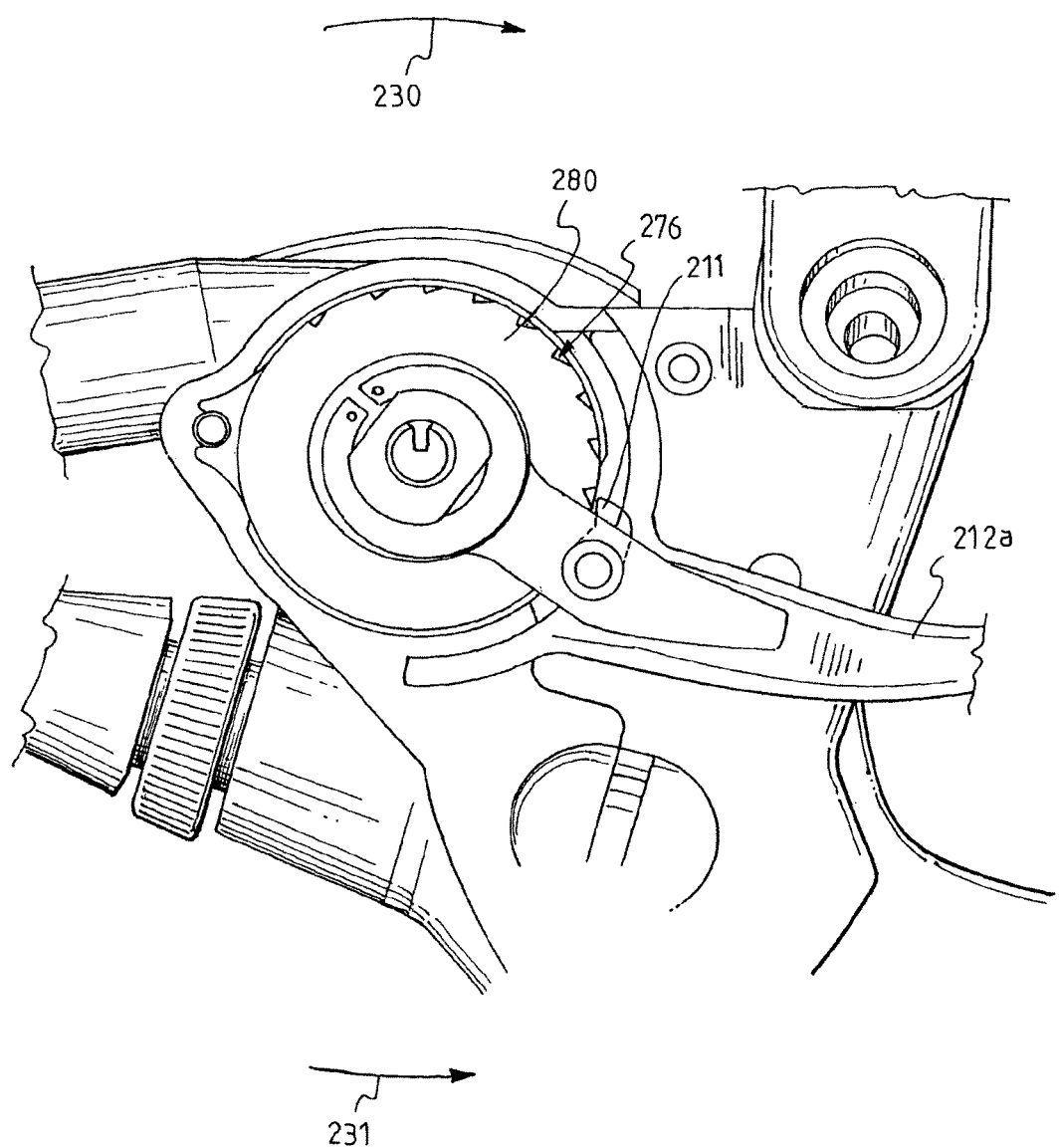
FIG. 17 is a plan view from below, with parts partially removed and sectioned, of some details of the device of FIG. 10, with the downwards actuation lever in rest position.

The indexer assembly of the device 200 are described hereafter, with particular reference to FIGS. 14 and 15.

In the ball-carrying disc 280 two radial grooves 280' are formed, closed towards the outside and towards the inside, the same as each other and diametrically opposite, in each of which a respective ball 210 is housed mobile; the two balls 210 are elastically biased outwards in the grooves 280' by respective helical springs 275, mounted on the disc 280 in the same grooves 280' and compressed between the balls 210 and the inner radial abutments 281. The grooves 280' are open on one side of the disc 280 facing towards the indexing disc 270, and have a lower depth than the diameter of the balls 210 that thus project from them in the axial direction.

In the indexing disc 270 two recesses 273 are formed that are the same as each other and point for point diametrically opposite; the two recesses extend for a little less than 180°, and thus appear fitted together.

Each recess 273 has a depth such as to receive the balls 210, or rather the portion of such balls 210 that projects from the groove 280' of the disc 280, and is arranged according to a path that comprises ten stop zones (numbered from $274^I$ to $274^X$) alternated by nine sliding zones (numbered from $234^I$ to $234^{IX}$).

In such a way, the balls 210 are engaged at a first side with a stationary member in the casing 202, formed by the indexing disc 270 with its recesses 273, and at a second side with a rotating member integral in rotation with the cable-winding bobbin 204, formed from the ball-carrying disc 280 with its grooves 280'.

An intermediate stop zone, for example the zone $274^{VII}$ (but the same thing goes for all of the zones from $274^{II}$ to $274^{IX}$), is defined by a stop wall $274^{VII}$a and by a sliding wall $234^{VII}$a, extending the first along a stop direction (indicated with T), the second along a sliding direction (indicated with S). The stop direction T and sliding direction S define an acute angle β between them that does not enclose the radial direction R passing by the stop zone stop zone $274^{VII}$, i.e. the main axis B of the device 100. The stop wall $274^{VII}$a is thus undercut with respect to the radial direction R. The sliding wall $234^{VII}$a extends along the sliding direction S from the stop zone $274^{VII}$ for the entire sliding zone $234^{VII}$ adjacent to it.

The recesses 273 are not closed at the ends, nor towards the inside; they thus form a continuous outer peripheral margin, regularly indented due to the presence of the succession of stop zones and sliding zones, without an analogous inner margin.

The first stop zone $274^I$ is defined like the others by a stop wall $274^I$a and by a sliding wall $234^I$a, extending along a sliding direction for the entire adjacent sliding zone $234^I$.

In the same way, the last stop zone $274^X$ is defined by a stop wall $274^X$a and by a sliding wall $234^X$a, extending in a sliding direction.

The fact that the stop zones are ten in number means that the illustrated device 200 is intended for a gearshift with ten ratios, clearly a rear gearshift. Should it be necessary to operate on a gearshift with a different number of ratios, an equal number of stop zones must be provided. Clearly, there would in any case remain a first and a last stop zone, with a suitable number of intermediate stop zones in between.

The operation of the device 200, with particular reference to its indexer assembly, is the following.

In static conditions of the device, when the cyclist does not act upon it, the ratio of the gearshift set previously must be maintained (for example the seventh), i.e. the cable K must neither be wound upon nor unwound from the bobbin 204. In other words, the bobbin 204 must not rotate, even if subjected to the traction applied on the cable K by the return spring present in the gearshift, which would tend to make the bobbin 204 rotate in direction 231, as well as knocks and bangs caused by the ride of the bicycle, which can clearly act in any direction.

This is obtained thanks to the indexer assembly. The rotation of the bobbin 204 is prevented by the fact that the balls 210 are on one side blocked in the grooves 280', and on the other side engaged in stop zones $274^{VII}$ of the recess 273.

The traction transmitted by the cable K ensures that each ball 210 thrusts against the stop wall $274^{VII}$a in the direction 231, but the undercut orientation of such a wall $274^{VII}$a ensures that such a thrust cannot displace the ball 210, blocked in the stop zone $274^{VII}$a. This condition determines an axial thrust on the indexing discs 270 and ball-holders 280 in the direction of their separation, prevented, however, by the springs 227; therefore, the springs 227 must be sized in such a way that the axial thrust applied by them is sufficient to avoid the moving apart of the two discs 270 and 280. The position of the balls 210 in the stop zones can thus be defined a stop position, since in such a position the balls make the discs 270 and 280 integral in rotation.

Stresses in the opposite direction due to knocks or the like could, on the other hand, have the balls 210 thrust upon the sliding walls $234^{VII}$a in direction 230. Such a thrust tends to thrust the balls 210 towards the inside of the grooves 208', but the movement is prevented by the elastic thrust of the springs 275, which must be suitably sized.

The springs 227 and 275 thus constitute countering members, first and second respectively, to counter the rotation of the cable-winding bobbin 204.

It is now assumed that the cyclist carries out upward gearshifting (i.e. towards a lower ratio, concerning controlling a rear gearshift).

For upward gearshifting, the cyclist acts upon the appropriate lever 218a, pressing it with the thumb of the right hand in the angular direction 230. By doing so, the second ratchet 217 goes into engagement with the toothed bobbin 216, thrusting it into rotation in the angular direction 230 together with the cable-winding bobbin 204, with its shank 206 and with all of the elements fitted integral in rotation with it; in particular, the ball-carrying disc 280 is rotated in direction 230.

It should first be noted that the first ratchet 211 does not prevent the rotation of the disc 280, since—with the lever 212a not actuated—the ratchet 211 is disengaged from the toothed sector 276 of the disc 280.

To obtain the rotation of the bobbin 204 and of the ball-carrying disc 280 in the angular direction 230, the cyclist must apply a force large enough so that the balls 210 are thrusted by the sliding walls 234$^{VII}$a towards the inside of the grooves 208', overcoming the radial thrust towards the outside of the springs 275. Whilst the action of the cyclist on the lever 218a continues, as the rotation of the bobbin 204 proceeds, the balls 210 then cross the sliding zone 234$^{VII}$a, finally reaching the height of the stop zone 274$^{VIII}$, where they are positioned, thrusted also by the springs 275. In such a position the balls 210 stay, as just described, maintaining the new ratio even after the cyclist has interrupted his action. The released lever 218a goes back into position thanks to the return spring 232.

It can be noted that, substantially during the entire upward gearshifting, the cyclist must overcome both the traction force on the cable K applied by the return spring of the gearshift, and the counter force applied by the springs 275 on the balls 210.

Preferably, to make upward gearshifting smooth, the counter force applied by the springs 275 on the two balls 210 is relatively low, with values for example of less than ⅟₂₀ the axial thrust force applied by the springs 227.

In the case in which the starting condition allows it, like in the case just considered in which the gearshift was in the seventh ratio, the action of the cyclist can be applied until double or multiple gearshifting is obtained. In this case, the reaching of the first adjacent ratio shall be perceived by the cyclist as a momentary reduction in the force required by gearshifting, due to the fact that at the moment of the displacement of the balls 210 from the sliding zone 234$^{VII}$ to the stop zone 274$^{VIII}$ the springs 275 operate not against but helping the cyclist, thrusting the balls 210 radially outwards; at such a moment, the cyclist can decide to keep such a ratio and thus interrupt his/her action by releasing the lever 218a, or else can proceed with his/her action until the subsequent ratio is obtained.

For downward gearshifting, for example starting from the seventh ratio, the cyclist acts, conversely, on the lever 212a, pulling it with the index finger in the angular direction 231. By doing so the first ratchet 211 goes into engagement with the toothed sector 276 of the ball-carrying disc 280, thrusting the bobbin 204 into rotation in the angular direction 231 together with its shank 206 and with all of the elements fitted integral in rotation with it; in particular, the toothed bobbin 216 is rotated in direction 231.

It should first be noted that the second ratchet 217 does not prevent the rotation of the toothed bobbin 216, since— with the lever 218a not actuated—the ratchet 217 is disengaged from the toothed bobbin 216.

During this action of the cyclist, the balls 210 thrust upon the stop walls 274$^{VII}$a causing an axial thrust upon the indexing disc 270 and ball-carrying disc 280 in the direction of their separation, against the springs 227. If the cyclist applies sufficient traction to overcome the counter action of the axial springs 227, the discs 270 and 280 go from the closed condition to the open condition. In such a condition, the balls 210 thus go out from the recess 273 and, due to the engagement in the grooves 208' which prevents a further radial displacement outwards, follow an arc of circumference path up to the stop zone 274$^{VI}$, where they position themselves under the axial thrust of the springs 227. In such a position the balls 210 stay, as just described, maintaining the new ratio even after the cyclist has interrupted his action. The released lever 212a goes back into position thanks to the return spring 236.

Also in downward gearshifting, in the same way as what has been seen for upward gearshifting, multiple gearshifting is possible.

It may be noted that, substantially during all of the downward gearshifting, the cyclist has the help of the traction force on the cable K applied by the return spring of the gearshift, but must overcome both the counter force applied by the springs 227 on the discs 270 and 280 (in the initial step of gearshifting), and (during the entire gearshifting) the friction between the balls 210 and the two discs 270 and 280. It should be noted that this friction, although in the presence of balls, is substantially sliding and nor rolling friction, since the coupling of each ball on the disc 270 is opposite that on the disc 280, so that the rotation of the balls 210 is actually prevented. The value of this friction can be suitably chosen by the sizing of the springs 227 which determine the force with which the discs 270 and 280 are pressed axially one towards the other; in such a way, it is possible in particular to ensure that such a friction force balances and overcomes the return force applied by the spring of the gearshift through the cable K, so as to have an active gearshift control.

What has been outlined above are two example embodiments of the invention, but of course other embodiments are possible. Some indications, in any case not to be understood in the limiting sense, are given hereafter.

A device can have two indexing discs like the device 100, but stationary like in the device 200, with a rotating ball-carrying disc. Or else a device can have just one indexing disc like the device 200, but rotating like in the device 100, with a stationary ball-carrying disc.

Either device can without distinction be adopted to control a rear or front gearshift, the only restriction being that of the number of stop zones.

The toothed sector on which the ratchet of a driving mechanism acts can be formed on any element of the member rotating with the cable-winding bobbin, be it an element already present for other functions (like the ball-carrying disc 280 of the device 200) or else an additional disc.

The first countering springs that thrust the balls radially outwards can be of various types (helical, flat or other) irrespective of the other characteristics of the device.

The second countering Belleville springs that thrust the discs axially one against the other can also be replaced by different elastic systems, such as groups of helical springs, elastomeric rings, etc.

The balls could also be replaced by members (sliding blocks or tappets) that do not rotate but slide, with a consequent increase in friction. In such a case, the sliding members could advantageously be integral or in one piece with the first countering springs. For this reason, in the previous description and in the subsequent claims the term "ball" must not be taken as limited to a spherical geometrical shape in the strict sense, but must also comprise any other functionally equivalent shape in the context and for the purposes of the present invention.

What is claimed is:

1. Actuation device for a control cable for a bicycle gearshift, comprising:
    a housing, attachable to a bicycle handlebar,
    a cable-winding bobbin, angularly mobile in the housing about a main axis of the device,
    a first driving mechanism, acting on the bobbin to rotate the bobbin in a first angular direction,
    a second driving mechanism, acting on the bobbin to rotate the bobbin in a second angular direction opposite the first angular direction,
    an indexer assembly to removably hold the bobbin in predetermined angular positions, wherein said indexer assembly comprises:
a first biased countering member, to counter the rotation of the bobbin in the first angular direction,
a second biased countering member, distinct from the first biased countering member, to counter the rotation of the bobbin in the second angular direction, and
at least two directly opposed discs that have a substantially identical diameter and are assembled together,
wherein one of the at least two opposed discs has a plurality of recesses that are dimensioned to releasably receive a stop member that is limited during the stop member's movement to travel within a radially outwardly extending groove that is formed in an other one of the at least two opposed discs that are assembled together,
the first biased countering member is arranged in the radially outwardly extending groove and the radially outwardly extending groove limits movement of the first biased countering member, and
the stop member is biased towards said plurality of recesses for direct engagement with a respective one of the plurality of recesses.

2. The device of claim 1, wherein the first biased countering member counters the rotation of the bobbin in a different direction than the second biased countering member.

3. The device of claim 1, wherein the first and/or the second biased countering member counters the rotation of the bobbin independently of the angular position of the bobbin.

4. A bicycle gearshift actuator comprising:
a) a housing configured for attachment to a bicycle handlebar;
b) a shaft that is carried by the housing;
c) a shank having a central opening and opposed flat faces;
d) a bobbin that has a central opening mounted adjacent the shank and defines a connection point for a gear shift cable, the bobbin and shank are positioned for rotation about the shaft;
e) a first lever operatively connected to the shank and bobbin and rotating the shank and bobbin in a first direction;
f) a second lever operatively connected to the shank and bobbin and rotating the shank and bobbin in a second direction; and
g) an indexer assembly having a first biased control portion that limits the rotation of the bobbin in the first direction, a second biased control portion that limits the rotation of the bobbin in the second direction, and
an indexing disc and a ball-carrying disc that have a substantially identical diameter and are directly opposed to one another,
wherein the indexing disc has a plurality of recesses that are dimensioned to releasably receive a stop member that is limited during the stop member's movement to travel within a radially outwardly extending groove that is formed in the ball-carrying disc,
the first biased control portion is arranged in the radially outwardly extending groove and the radially outwardly extending groove limits movement of the first biased control portion, and
the stop member is biased towards said plurality of recesses for direct engagement with a respective one of the plurality of recesses.

5. The actuator of claim 4, wherein the stop member comprises at least one ball, the indexing disc comprises a stationary member integral with the housing, and the ball-carrying disc comprises a rotating member integral in rotation with the bobbin, and the at least one ball is engaged both with the stationary member integral with the housing and with the rotating member integral in rotation with the bobbin;
the first biased control portion comprises a first countering spring that acts on the ball to keep the ball in a stop position; and
the second biased control portion comprises a second countering spring that acts upon the ball to keep the ball in the stop position.

6. The actuator of claim 5, wherein a rotation of the bobbin in a first angular direction biases the at least one ball away from the stop position, in contrast to the first countering spring.

7. The actuator of claim 5, wherein a rotation of the bobbin in a second angular direction biases the at least one ball away from the stop position, in contrast to the second countering spring.

8. The actuator of claim 5, wherein the ball-carrying disc is mounted in the housing and the at least one ball is mounted in the radially outwardly extending groove so that the at least one ball is thrusted radially outwards by the first countering spring, the radially outwardly extending groove being open on at least one side of the ball-carrying disc and having a depth such that the at least one ball projects in the axial direction from the ball-carrying disc;
the indexing disc is mounted in the housing in an interfacing position adjacent to the ball-carrying disc, facing the at least one side of the ball-carrying disc from which the at least one ball projects, and the plurality of recesses are arranged according to a pattern that comprises stop zones and sliding zones alternating with each other;
the second countering spring is mounted in the housing so as to axially bias the indexing disc and the ball-carrying disc one against the other;
the at least one ball, projecting axially from the radially outwardly extending groove on the ball-carrying disc, is engaged in the recess on the indexing disc.

9. The actuator of claim 8, wherein an intermediate of the stop zones is defined by a stop wall orientated according to a stop direction and by a sliding wall orientated according to a sliding direction, the stop direction and sliding direction of each of the stop zones defining an acute angle that does not enclose the main axis of the device.

10. The actuator of claim 9, wherein the stop walls are fitted to the sliding walls in a succession that forms an outer peripheral margin of the recess on the indexing disc.

11. The actuator of claim 10 wherein the recess on the indexing disc is defined towards the inside by an inner peripheral margin corresponding to the outer peripheral margin.

12. The actuator of claim 10 wherein the recess on the indexing disc is not defined towards the inside by any inner peripheral margin.

13. Device according to claim 8, wherein the groove in the ball carrying disc is open on both sides of such a disc and has a depth such that the ball projects in the axial direction from the ball-carrying disc, from both sides thereof; wherein
the indexer assembly also comprises a second indexing disc integral in rotation with the first indexing disc, mounted in the housing in an interfacing position adjacent to the ball-carrying disc on the opposite side with respect to the first indexing disc and provided with a recess specularly corresponding to that of the first indexing disc; and wherein the ball, projecting axially from the groove on the ball-carrying disc, is engaged both in the recess on the first indexing disc, and in the recess on the second indexing disc.

14. The actuator of claim 8, wherein the stationary member comprises the ball-carrying disc and the rotating member comprises the first indexing disc.

15. The actuator of claim 5, wherein the indexer assembly comprises a further ball, engaged both with the stationary member and with the rotating member.

16. The actuator of claim 15, wherein the indexer assembly includes a further first countering spring that acts upon the further ball to keep the further ball in a stop position.

17. The actuator of claim 16, wherein a rotation of the bobbin in the first angular direction biases the further ball against an associated first countering spring away from the stop position.

18. The actuator of claim 16, wherein a rotation of the bobbin in the second angular direction biases the further ball against the second countering spring away from the stop position.

19. The actuator of claim 15, wherein:

the ball-carrying disc is mounted in the housing, and the radially outwardly extending groove includes at least two radially outwardly extending grooves, in each of said at least two radially outwardly extending grooves being mounted one of said balls so that each ball is thrusted radially outwards by a respective one of the first countering spring or a further first countering spring, the at least two radially outwardly extending grooves being open on at least one side of the ball-carrying disc and having a depth such that the balls project in the axial direction from the ball-carrying disc;

the indexing disc is mounted in the housing in an interfacing position adjacent to the ball-carrying disc, facing the at least one side of the ball-carrying disc from which the balls project, the plurality of recesses have identical profiles and are arranged according to patterns that comprise stop zones and sliding zones alternating with each other; and wherein:

the second countering spring is mounted in the housing so as to axially bias the indexing disc and the ball-carrying disc one against the other;

the balls, projecting axially from the at least two radially outwardly extending grooves on the ball-carrying disc, are respectively engaged in the two recesses on the indexing disc.

20. The actuator of claim 19, wherein an intermediate of the stop zones is defined by a stop wall orientated according to a stop direction and by a sliding wall orientated according to a sliding direction, the stop direction and sliding direction of each of the stop zones defining an acute angle that does not enclose the main axis of the device.

21. The actuator of claim 20, wherein the stop walls are fitted to the sliding walls in a succession that forms an outer peripheral margin of the recesses on the indexing disc.

22. The actuator of claim 21, wherein the recess on the indexing disc is defined towards the inside by an inner peripheral margin corresponding to the outer peripheral margin.

23. The actuator of claim 21, wherein the recesses on the indexing disc are not defined towards an inner radial direction by any inner peripheral margin.

24. The actuator of claim 19, wherein:

the grooves in the ball-carrying disc are open on both sides of such a disc and have a depth such that the balls project in the axial direction from the ball-carrying disc, from both sides thereof; wherein the indexer assembly also comprises a second indexing disc integral in rotation with the first indexing disc, mounted in the housing in an interfacing position adjacent to the ball-carrying disc on the opposite side with respect to the first indexing disc and provided with a recess specularly corresponding to that of the first indexing disc; and wherein the balls, projecting axially from the grooves on the ball-carrying disc, are engaged both in the recess on the first indexing disc, and in the recess on the second indexing disc.

25. The actuator of claim 19, wherein the stationary member comprises the ball-carrying disc and the rotating member comprises the first indexing disc.

26. The actuator of claim 5, wherein the first countering spring is a helical spring compressed between the ball and an abutment on the ball-carrying disc.

27. The actuator of claim 8, wherein the first countering spring is a flat spring mounted on the ball-carrying disc and acting on the ball.

28. The actuator of claim 8, wherein the first countering spring is a single flat spring mounted on the ball-carrying disc and acting on the two balls.

29. The actuator of claim 8, wherein the second countering spring is a Belleville washer, arranged coaxially to the ball-carrying disc and to the indexing disc.

30. The actuator of claim 8, wherein the second countering spring is an elastically deformable elastomeric ring, arranged coaxially to the ball-carrying disc and to the indexing disc.

31. The actuator of claim 5, wherein the first countering spring applies on the ball or on the balls a force in the radial direction that is less than 1/20 of the force that the second countering spring applies on the ball or on the balls in the axial direction.

\* \* \* \* \*